US012359783B2

(12) United States Patent
Sherman

(10) Patent No.: US 12,359,783 B2
(45) Date of Patent: Jul. 15, 2025

(54) SYSTEM AND APPARATUS TO ATTACH A LIGHT FIXTURE TO ONE OF A CEILING, A RECESSED LIGHTING FIXTURE HOUSING, OR AN OUTLET BOX OR A JUNCTION BOX

(71) Applicant: David Sherman, Thornhill (CA)

(72) Inventor: David Sherman, Thornhill (CA)

(73) Assignee: DS Advanced Enterprises, Ltd., Ontario (CA)

(*) Notice: Subject to any disclaimer, the term of this patent is extended or adjusted under 35 U.S.C. 154(b) by 0 days.

(21) Appl. No.: 17/536,202

(22) Filed: Nov. 29, 2021

(65) Prior Publication Data

US 2023/0062273 A1 Mar. 2, 2023

Related U.S. Application Data

(60) Provisional application No. 63/237,560, filed on Aug. 27, 2021.

(51) Int. Cl.

| | |
|---|---|
| ***F21S 8/02*** | (2006.01) |
| ***F21V 17/18*** | (2006.01) |
| ***F21V 23/06*** | (2006.01) |

(52) U.S. Cl.

CPC ................ *F21S 8/02* (2013.01); *F21V 17/18* (2013.01); *F21V 23/06* (2013.01)

(58) Field of Classification Search

CPC ............. F21V 23/06; F21V 17/18; F21S 8/02
See application file for complete search history.

(56) References Cited

U.S. PATENT DOCUMENTS

| | | | | |
|---|---|---|---|---|
| 5,957,572 A | 9/1999 | Wedekind | | |
| 6,350,046 B1 * | 2/2002 | Lau | ......................... | F21V 29/15 362/147 |

(Continued)

FOREIGN PATENT DOCUMENTS

| | | |
|---|---|---|
| CA | 3040941 | 11/2020 |
| CN | 206018423 | 3/2017 |

(Continued)

OTHER PUBLICATIONS

*DS Advanced Enterprises, LTD.* v. *Lowe's Companies, Inc et al.*, Case No. 3:23-cv-01335-CAB-JLB (S.D. Cal.), 2023, Defendant's Invalidity Contentions, Defendant's Answer, and Docket Report, US.

(Continued)

*Primary Examiner* — Anabel Ton

(74) *Attorney, Agent, or Firm* — Cummins IP Law PLLC; Patrick D. Cummins

(57) ABSTRACT

An apparatus to attach a light fixture to a ceiling, a recessed lighting fixture housing, or a ceiling, wall, or floor electrical outlet box. The apparatus may include one or a plurality of retrofit clips (102) and (103), new construction clips (104), connecting posts (106), a junction box (116), twist connectors (118) an installation clamp (1409), an installation plate (1402), a mounting bracket (1404), wire nuts (1407), threaded pipes (1405) & (1410), lock nuts (1406), threaded coupling (1408), and other common accessories known by those skilled in the art. The retrofit clips (102) and (103) are adaptable to attach with a body (108) or a complete fixture (112), (901) and (902) by one or more of screwing, riveting, welding, gluing, or other suitable attachment methods into one or more of screw holes (110), if provided, or directly attached to a body (108) or directly attached to a complete light fixture (112), (901) & (902). The connecting posts (106), if provided, may hold new construction clips (104);

(Continued)

and the body (108) and complete fixture (112), (901) & (902) may be of various designs, shapes, sizes, thicknesses, and materials. The junction box (116) may hold input connection wires (1202). The junction box (116) may comprise a plurality of output wires (119), with or without protective sleeves. The twist connector (118), if provided, attaches the output wires (119) of the junction box (116) to the input wires (120), with or without protective sleeves, of the body (108) or complete fixture (112), (901) and (902).

16 Claims, 33 Drawing Sheets

(56) References Cited

U.S. PATENT DOCUMENTS

| | | | | |
|---|---|---|---|---|
| 7,722,227 | B2 | 5/2010 | Zhang | |
| 8,696,158 | B2 | 4/2014 | Santiago | |
| 8,789,978 | B2 * | 7/2014 | Tickner | F21V 29/74 362/373 |
| 8,894,253 | B2 | 11/2014 | Rowlette | |
| 8,967,844 | B2 | 3/2015 | Boomgaarden | |
| 9,500,320 | B1 * | 11/2016 | Green | F21S 8/026 |
| 9,557,021 | B2 | 1/2017 | Madden | |
| 9,709,253 | B2 | 7/2017 | Tickner | |
| 9,732,947 | B1 | 8/2017 | Christ | |
| 9,739,455 | B2 | 8/2017 | Rodriguez | |
| 10,091,855 | B2 | 7/2018 | Winkle | |
| 10,247,399 | B1 | 4/2019 | Winters | |
| 10,281,120 | B1 | 5/2019 | Winslett | |
| 10,393,359 | B1 | 8/2019 | Qi | |
| 10,458,628 | B2 | 10/2019 | Vidal | |
| 10,634,320 | B2 * | 4/2020 | Halliwell | F21S 8/04 |
| 10,989,398 | B2 | 4/2021 | Winters | |
| 11,047,538 | B2 * | 6/2021 | Danesh | F21S 8/043 |
| 11,054,118 | B2 | 7/2021 | Sherman | |
| 11,255,497 | B2 * | 2/2022 | Danesh | H02G 3/08 |
| 11,435,064 | B1 * | 9/2022 | Danesh | F21V 21/04 |
| 11,624,500 | B2 * | 4/2023 | Kim | F21V 23/06 362/373 |
| 2009/0080189 | A1 | 3/2009 | Wegner | |
| 2015/0233537 | A1 | 8/2015 | Athalye | |
| 2017/0059102 | A1 | 3/2017 | Grant | |
| 2017/0314750 | A1 * | 11/2017 | Feldman | F21V 17/162 |
| 2018/0313524 | A1 | 11/2018 | Vidal | |
| 2020/0191344 | A1 | 6/2020 | Winkle | |

FOREIGN PATENT DOCUMENTS

| | | | | | |
|---|---|---|---|---|---|
| CN | 206582689 | | | 10/2017 | |
| CN | 207094400 | | | 3/2018 | |
| CN | 212273811 | | | 1/2021 | |
| GB | 2471929 | A | * | 1/2011 | A62C 2/065 |
| GB | 2017098487 | | | 6/2017 | |
| WO | 2019014798 | A1 | | 1/2019 | |

OTHER PUBLICATIONS

*DS Advanced Enterprises* v. *Ledvance LLC et al.*, Case No. 1:24-cv-11155-JEK (D. Mass.), 2024, Docket Report, US.
*DS Advanced Enterprises* v. *Cooper Lighting LLC et al.*, Case No. 5:23-cv-02603-JAK-SHK (C.D. Cal.), 2023, Defendants' Answers and Docket Report, US.
*DS Advanced Enterprises* v. *Ledvance LLC et al.*, Case No. 5:23-cv-02058-MCS-PD (C.D. Cal.), 2023, Docket Report, US.
Sea Gull Lighting, 2019 Generation Lighting Catalog for Sea Gull Collection, 2019, pp. 600-611, US.
Trade Access/Common Core, Trade Access Common Core, Line E: Electrical Fundamentals, Competency E-3: Explain Wiring Connections, 2015, pp. 13-15, US.
*DS Advanced Enterprises* v. *Cooper Lighting LLC et al.*, Case No. 5:23-cv-02603-JAK-SHK (C.D. Cal.), 2023, Defendants' Invalidity Contentions, US (attached with exhibits).
Halo RL56 referenced in Non-Patent Literature Cite No. 1, Exhibit A, by Cooper Lighting and Amazon.com (cannot verify alleged publication date).
Halo SMD4/SMD6 referenced in Non-Patent Literature Cite No. 1, Exhibit B, by Cooper Lighting and Amazon.com (cannot verify alleged publication date).
Halo ML706830 referenced in Non-Patent Literature Cite No. 1, at Annex A, by Cooper Lighting (cannot verify alleged publication date).

* cited by examiner

SYSTEM AND APPARATUS TO ATTACH A LIGHT FIXTURE TO ONE OF A CEILING, A RECESSED LIGHTING FIXTURE HOUSING, OR AN OUTLET BOX OR A JUNCTION BOX

CROSS-REFERENCE TO RELATED APPLICATIONS

This application claims priority to, U.S. Patent Application Ser. No. 63/237,560 filed on Aug. 27, 2021, the disclosures of which are incorporated by reference herein in their entirety.

TECHNICAL FIELD

The present invention is generally related to an apparatus to attach a lighting fixture embodying at least one of an LED (light-emitting diode) lamp, an incandescent lamp, a fluorescent lamp, an HID (high-intensity discharge) lamp, an LED array, an LED strip, a PCBA (printed circuit board assembly), or other light source to at least one of a ceiling, a recessed lighting fixture housing, or a ceiling, floor, or wall electrical outlet box.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Typically, consumers and/or electricians have to buy different light fixtures for new construction installations, retrofit installations, and electrical outlet box installations. Currently, various mounting clips, installation plates, and accessories are used either for retrofit installations, new construction installations, or electrical outlet box installations. This specification recognizes the problems faced by the consumers and/or electricians while installing light fixtures. Additionally, it is recognized in this specification that an apparatus for retrofit installation, new construction installations, and electrical outlet box installations contained in one lighting fixture can reduce the amount of inventory carried by lighting distributors. In addition, this specification does not require the purchase and use of additional electrical accessories, or recessed lighting housings, or other components, thus saving the user or electrician money and time during the installation of lighting fixtures.

Thus, in view of the above, there is a long-felt need in the industry to address the aforementioned deficiencies and inadequacies.

Further limitations and disadvantages of conventional and traditional approaches will become apparent to one of skill in the art through comparison of described systems with some aspects of the present disclosure, as set forth in the remainder of the present application and with reference to the drawings.

SUMMARY OF THE INVENTION

An apparatus to attach a light fixture embodying LED, incandescent, fluorescent, HID, or other lighting systems to at least one of a ceiling, a recessed lighting fixture housing, or a ceiling, floor, or wall electrical outlet box is provided substantially, as shown in and/or described in connection with at least one of the figures, as set forth more completely in the claims.

The apparatus comprises a plurality of friction retrofit clips and torsion spring retrofit clips of varying designs, sizes, shapes, thicknesses, and materials, an installation plate of varying designs, sizes, shapes, thicknesses, and materials, an installation clamp of varying designs, sizes, shapes, thicknesses, and materials, a plurality of new construction clips of varying designs, sizes, shapes, thicknesses, and materials, a plurality of connecting posts, if required by design, a base of varying designs, sizes, shapes thicknesses, and materials, a plurality of holes, if required, a complete fixture of varying designs, sizes, shapes thicknesses, and materials, a socket adapter of varying designs, sizes, shapes thicknesses, and materials, a fixed or removable junction box of varying designs, sizes, shapes thicknesses, and materials may be provided by design, and may contain a plurality of twist connectors, wire nuts, Or other type of suitable wire connectors. The plurality of retrofit clips (torsion spring and friction), new construction clips, attachment plates, and attachment clamps, of various designs, sizes, shapes, thicknesses, and materials, if provided, are adaptable to attach to the body of the light fixture by screwing, riveting, gluing, welding, or other suitable attachment methods into a plurality of holes, if required by design. The connecting posts may hold the new construction clips or retrofit clips if required by design. The body of varying designs, sizes, shapes, thicknesses, and materials embodies the complete fixture. If a removable or fixed junction box of varying designs, sizes, shapes, thicknesses, and materials, is provided, it may hold a plurality of connection wiring and output wires and may also contain one or a plurality of an LED driver, a transformer, a WIFI module, a ballast, or other electrical components and may contain a dedicated section to allow for the connection of wiring. In an aspect, the junction box may be removable or fixed in position on the body or complete fixture. The wire nuts, or other types of suitable wire connectors attach the building's electrical supply wires to the wires of the junction box or complete fixture as provided by design. The socket adapter, if provided, replaces a light bulb in a recessed lighting fixture housing.

In an aspect, the new construction clips of varying designs, sizes, shapes, thicknesses, and materials, squeeze ceiling material placed between the new construction clips and an extremity of the body or complete fixture.

In an aspect, the retrofit clips of varying designs, sizes, shapes, thicknesses, and materials, are secured to an existing recessed lighting housing of a plurality of designs, sizes, shapes, thicknesses, and materials.

In an aspect, the recessed lighting housing includes a plurality of first electrical systems, and a plurality of first accessories.

In an aspect, the complete fixture includes a plurality or designs, sizes, shapes, thicknesses, and materials.

In an aspect, the complete fixture includes a plurality of second electrical systems, a plurality of clips, and a plurality of second accessories In an aspect, the junction box is configured to secure one or more of an LED driver, a transformer, a WIFI module, a ballast, or other electrical components.

In an aspect, the junction box includes a predefined area to attach a plurality of wires.

In an aspect, the light fixture is installed to an already existing ceiling, wall, or floor electrical outlet box.

Accordingly, one advantage of the present system and method is that it provides a retrofit application, a new construction application, and an electrical outlet box application enclosed in the same light fixtures, varying, designs, sizes, shapes, thicknesses, and materials, and varying electrical systems.

Accordingly, one advantage of the present invention is that it allows lighting retailers and distributors to carry only one set of inventories, thus saving money and warehouse space. In addition, this specification does not require the purchase and installation of additional electrical accessories, or recessed lighting housings, or other components, thus saving the user or electrician money and time during the installation of lighting fixtures.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of apparatus, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
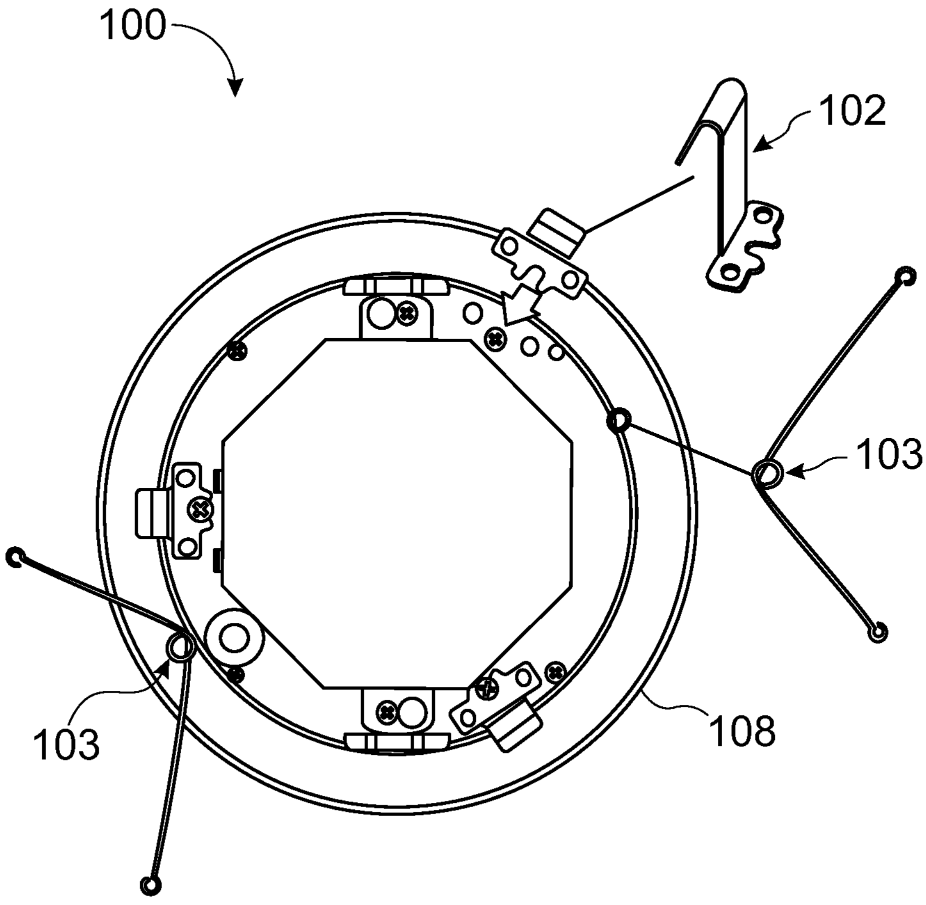
FIG. 1 illustrates an exemplary view of the retrofit clips in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented, and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The present specification describes an apparatus to attach a light fixture of varying light sources, designs, sizes, shapes, thicknesses, and materials to one of a ceiling, a recessed lighting fixture housing, or an electrical outlet box. The apparatus may contain a combination of one or more of retrofit clips (102) and (103), new construction clips (104), installation plates (1402), installation clamps (1409), connecting posts (106), if required by design, a body (108), screw holes (110), if required by design, a complete fixture (112) & (901) & (902), a socket adapter (114), a removable or fixed junction box (116), wire connectors (118), wire nuts (1407), screws (1411), and other accessories normally included and know to those experienced in the electrical field.

FIG. 1 illustrates an exemplary view (100) of retrofit clips (102) and (103), in accordance with at least one embodiment. Such retrofit clips may be of varying designs, sizes, shapes, thicknesses, and materials, and methods of attachment to the light fixture.

Figure 3:
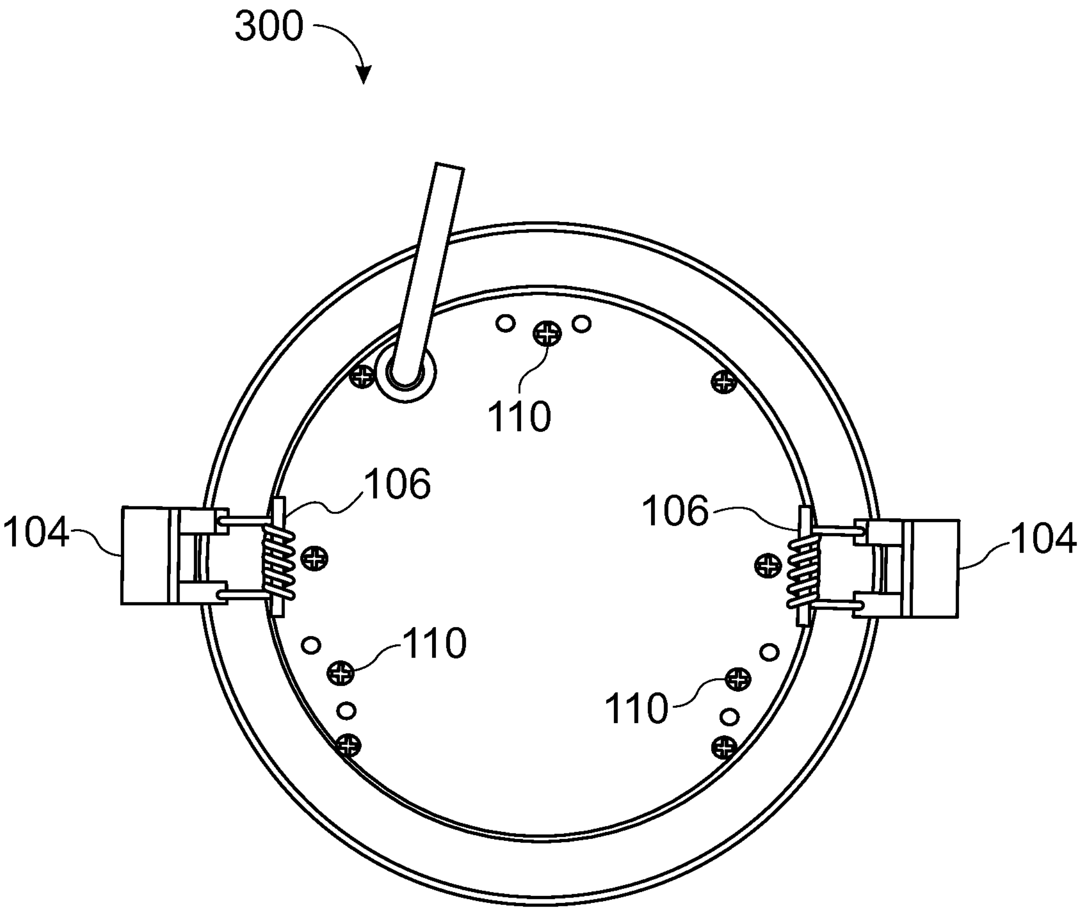
FIG. 3 illustrates an exemplary view of new construction clips and screw holes, in accordance with at least one embodiment.

The plurality of retrofit clips (102) and (103) are adaptable to attach with the body (108) of the light fixture by screwing, riveting, gluing or welding, or other suitable attachment method into a plurality of screw holes, if necessary, by design (110), as shown in FIG. 3.

Figure 2A:
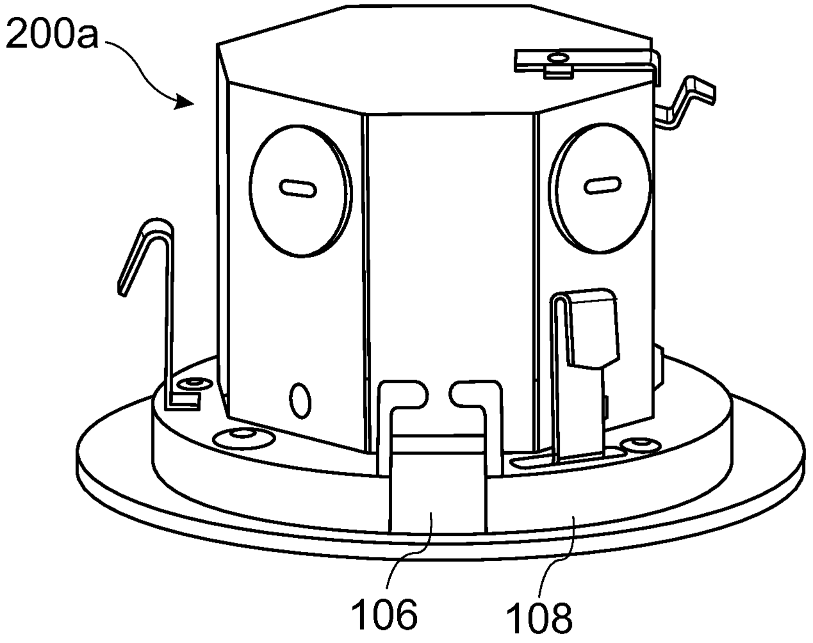
FIG. 2A illustrates an exemplary view of connecting post and body, in accordance with at least one embodiment.

FIG. 2*a* illustrates an exemplary view (200*a*) of connecting post (106) and body (108), in accordance with at least one embodiment. In another case connecting posts may not be necessary if the retrofit clips (102) and (103) or new construction clips (104) are screwed, riveted, glued, welded, or attached by other suitable methods directly to the body (108). The plurality of connecting posts (106), if provided, may hold the new construction clips (104) or retrofit clips (102) & (103). The body (108) embodies a complete fixture (112), shown in FIG. 6, FIG. 7 and FIG. 9.

Figure 2B:
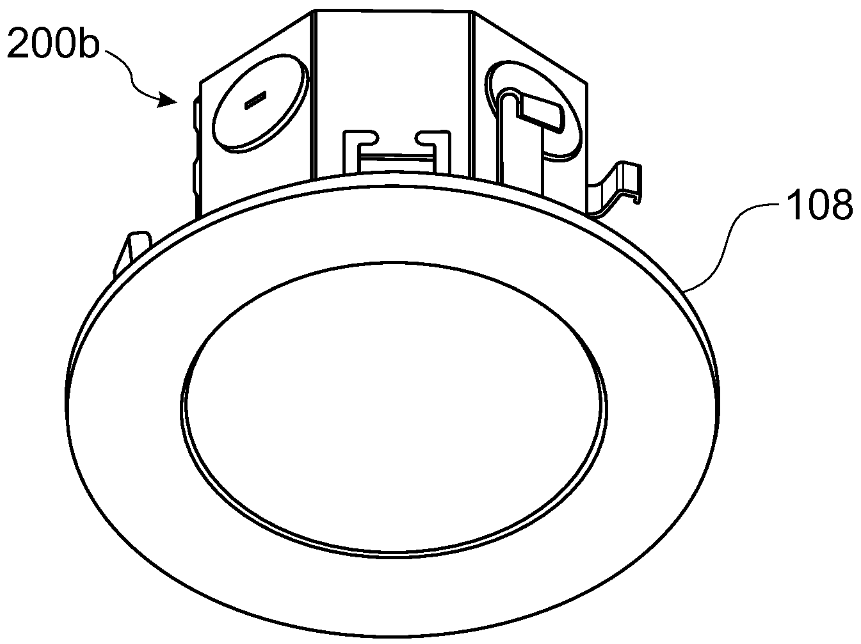
FIG. 2B illustrates an exemplary view of one design of a fixture body, in accordance with at least one embodiment.

FIG. 2*b* illustrates an exemplary view (200*b*) of the body (108), such bodies may be of varying designs, sizes, shapes, sizes, and materials, in accordance with at least one embodiment.

FIG. 3 illustrates an exemplary view (300) of new construction clips (104) attached to connecting posts (106) and screw holes (110), in accordance with at least one embodiment.

Figure 4:
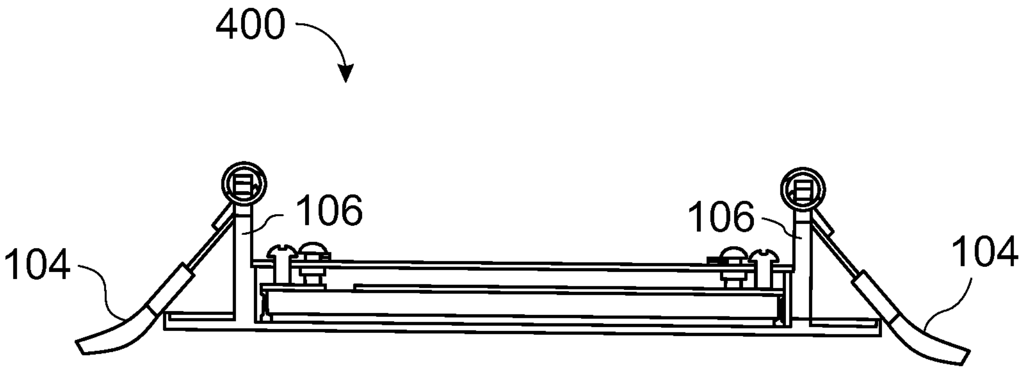
FIG. 4 illustrates an exemplary view of connecting posts, in accordance with at least one embodiment.

FIG. 4 illustrates another exemplary view (400) of the connecting post (106) and new construction clips (104), in accordance with at least one embodiment.

Figure 5:
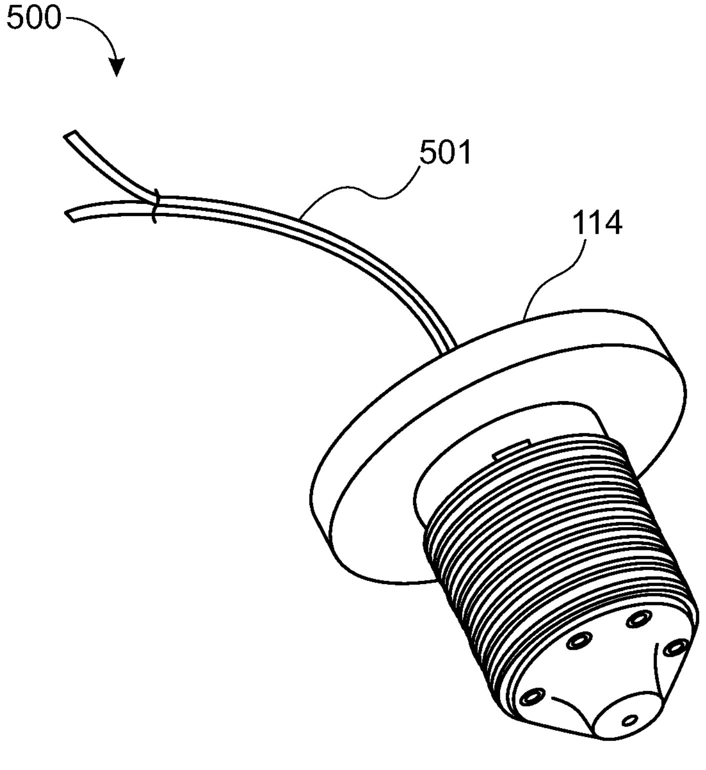
FIG. 5 illustrates an exemplary view of one type of socket adapter, in accordance with at least one embodiment.

FIG. 5 illustrates an exemplary view (500) of socket adapter (114), with attached wires (501) in accordance with at least one embodiment. The socket adapter (114) replaces a light bulb in a recessed lighting fixture housing, if required in a retrofit application.

Figure 6:
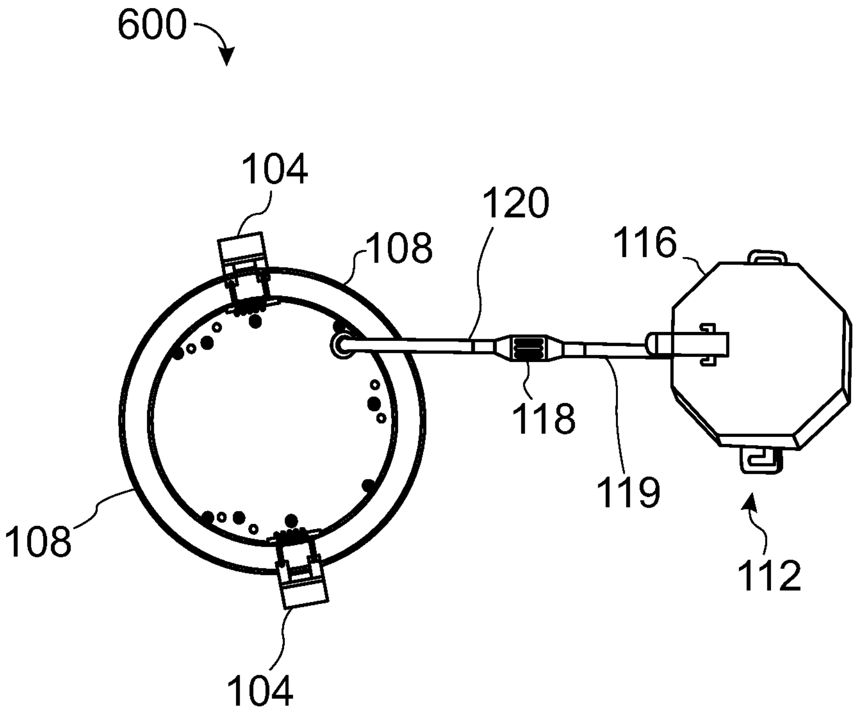
FIG. 6 illustrates an exemplary view of one example of a complete fixture, in accordance with at least one embodiment.

FIG. 6 illustrates an exemplary view (600) of one example of a complete fixture (112), in accordance with at least one embodiment. In an embodiment, the new construction dips (104) squeeze ceiling material (1102) placed between the new construction clips (104) and an extremity (126) of the body (108), see FIG. 12A, FIG. 12B, and FIG. 12C. In an embodiment, the complete fixture (112) comprises a base (108), plurality of electrical systems, clips, and accessories, and may contain a junction box Examples of the electrical systems may include but are not limited to an LED driver, a transformer, a WIFI module, a ballast, a PCBA, an LED lamp, an LED strip, and a lamp holder of varying sizes and designs for a variety of lamps. Further, examples of accessories include but are not limited to wire nuts (1407), wire connectors, Wires, screws, rivets, ground wires, mounting plates (1404), and other usual accessories known to those experienced in the electrical field.

Figure 7:
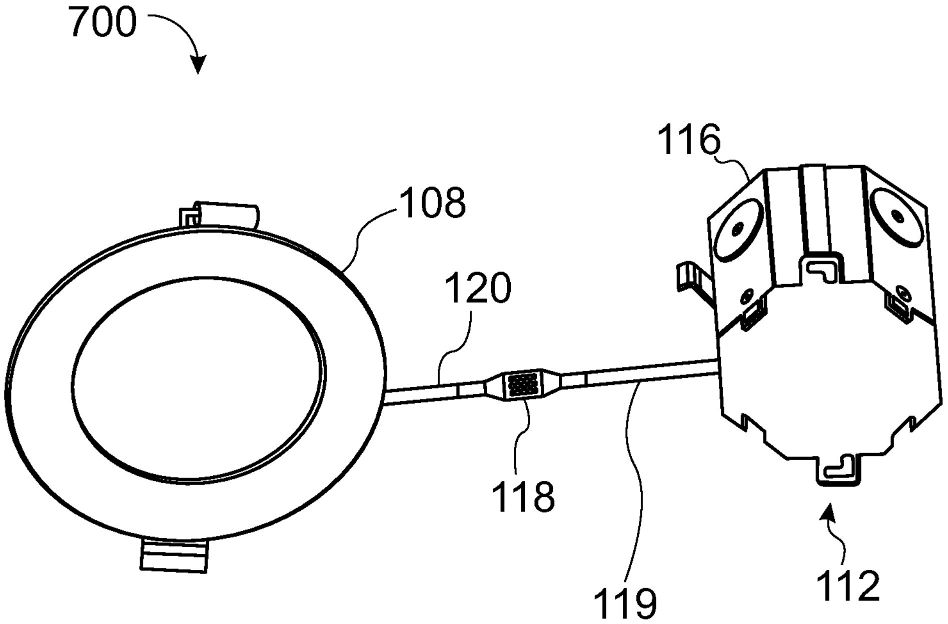
FIG. 7 illustrates an exemplary view of the removable junction box and twist connector, in accordance with at least one embodiment.

FIG. 7 illustrates an exemplary view (700) of a removable junction box (116) and twist connector (118), in accordance with at least one embodiment. The removable junction box (116) holds a plurality of connection wirings and may include an LED driver, a transformer, a WIFI module, a ballast, or other electrical components. The removable junction box (116) comprises a plurality of output wires (119) enclosed within a protective sleeve. The twist connector (118) attaches the output wires (119) enclosed within a protective sleeve, of the junction box (116) to the input wires (120) enclosed within a protective sleeve, of the body (108). In an embodiment, the junction box (116) allows an LED driver, a transformer, a WIFI module, a ballast, or other electrical components to be installed and includes a predefined area to attach a plurality of wires, coming from the building's electrical system.

In operation, if an existing recessed housing is present, the retrofit clips (102) in this case make a friction fit inside the existing recessed lighting fixture housing to secure the complete fixture (112) & (900) & (901) inside such housing. Additionally, in some retrofit applications, the torsion spring retrofit clips (103) may be used to secure the complete fixture (112), (900), & (901) to tabs (1004) located on the inside wall of such housing.

Figure 8A:
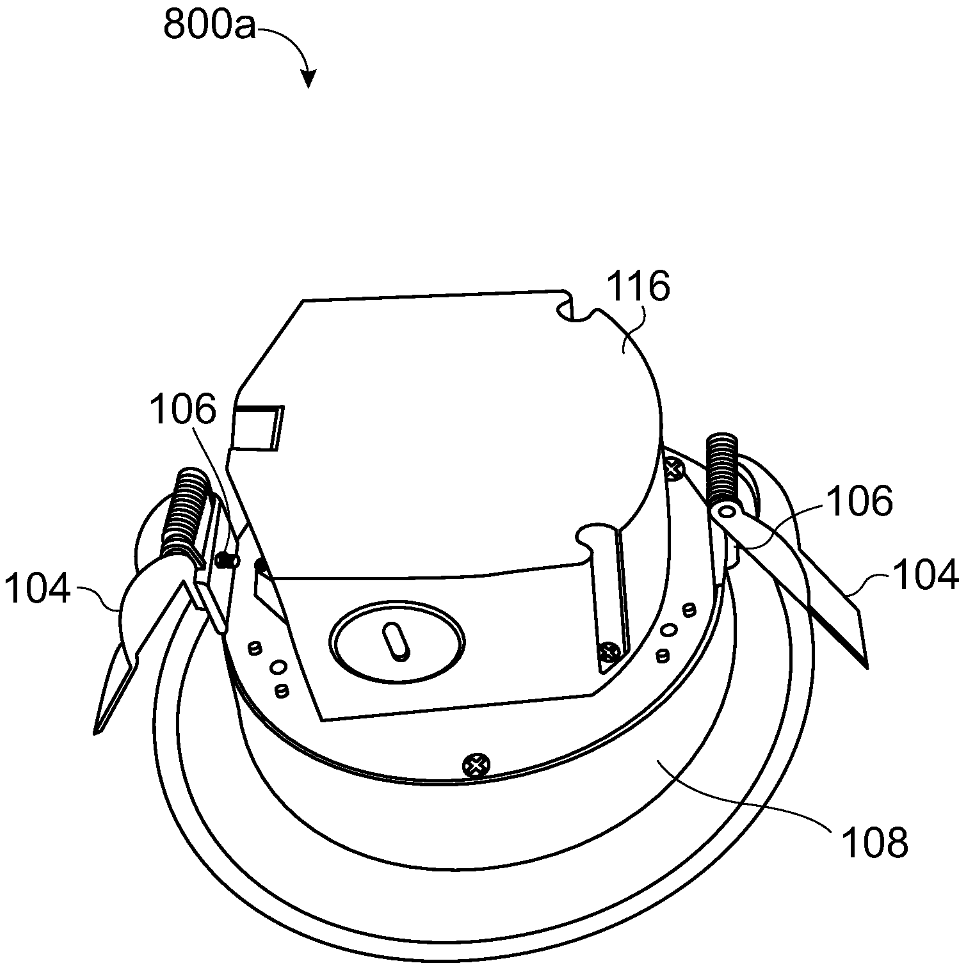
FIG. 8A illustrates a first exemplary view of a permanently installed junction box, with new construction clips, in accordance with at least one embodiment.
Figure 8B:
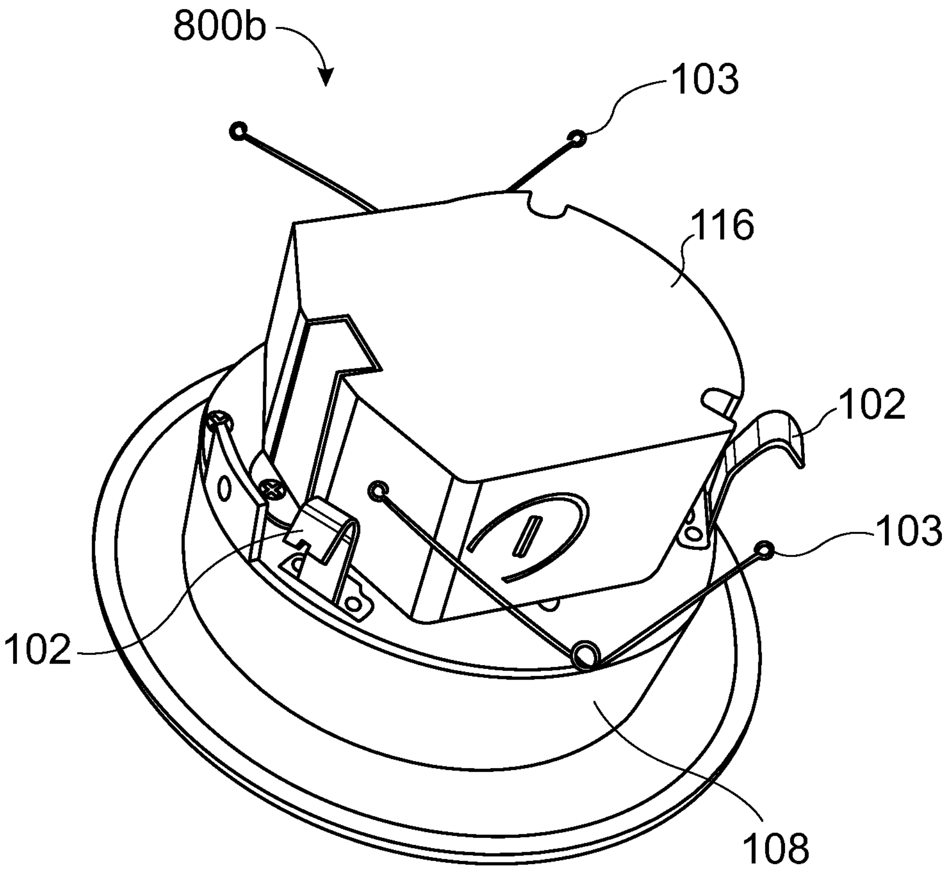
FIG. 8B illustrates a second exemplary view of the permanently installed fixed junction box, with retrofit clips, in accordance with at least one embodiment.

FIG. 8*a* illustrates a first exemplary view (800*a*) of a permanently installed junction box (116), in accordance with at least one embodiment. FIG. 8*b* illustrates a second exemplary view (800*b*) of the permanently installed junction box (116), in accordance with at least one embodiment. The junction box (116) is permanently attached to the body (108). The first exemplary view (800*a*) and the second exemplary view (800*b*) show an absence of output wires from the junction box (116) to the body (108). In real-time, the wires coming from a building's electrical system (1201) are connected to input wires located inside the junction box (116) connections are internally arranged and cannot be seen by the user. FIG. 8*a* depicts the placement of the new construction clip (104), connecting posts (106), and FIG. 8*b* depicts the placement of retrofit clips (102) and (103) when junction box (116) is permanently attached to the body (108), which can vary by design.

Figure 9A:
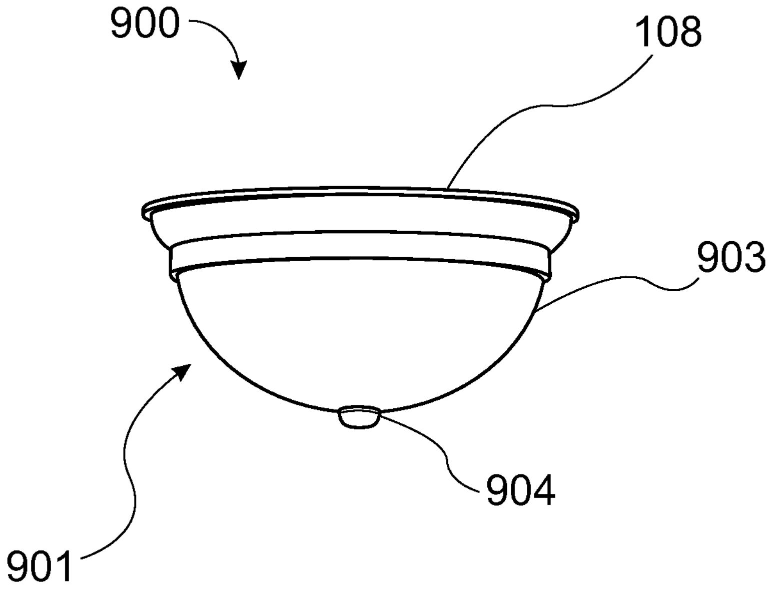
FIGS. 9A-9B illustrate perspective views of two examples of flush mount lighting fixtures that can embody a lighting system of any number of LED, incandescent, fluorescent, HID, or other suitable light sources, in accordance with at least one
Figure 9B:
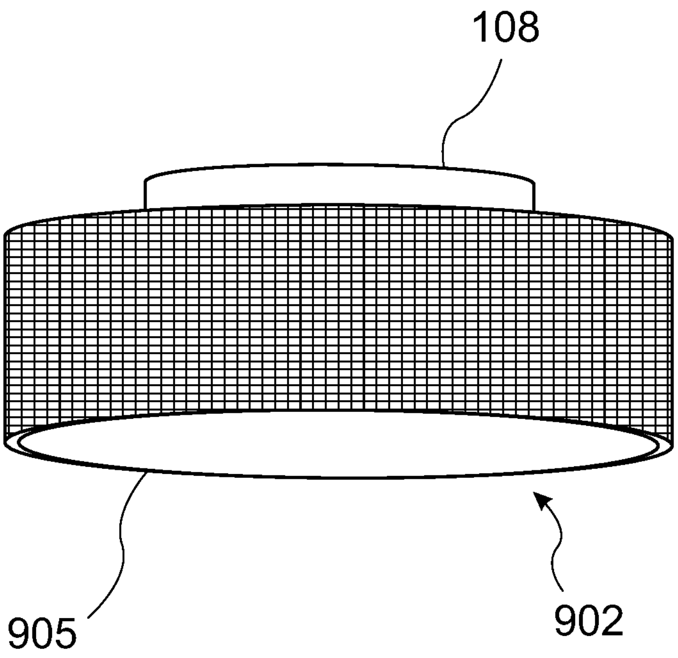

FIGS. 9A-9B depict two examples of flush mount lighting fixtures (901) & (902) that can embody a lighting system of any number of LED lamps, incandescent lamps, fluorescent lamps, HID lamps, LED arrays, PCBA's, LED strips, or other suitable light sources. This is only an example of embodiments. The design, size, shape, and materials can vary. It can also embody a base (108) a closed bottom lens or diffuser (903) or open bottom lens or diffuser (905) of varying designs, shapes, sizes and materials. Such flush mount fixtures (901) & (902) may embody new construction clips (104), retrofit clips (102) or (103), or a removable or fixed junction box (116), an additional housing, screws, bolts, mounting plates, and other similar accessories known to those who are experienced in the lighting field.

Figure 10A:
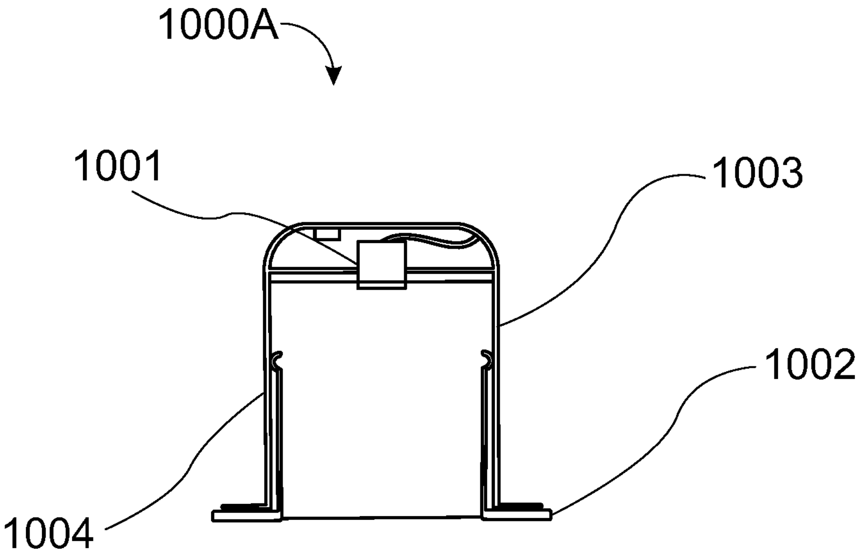
FIGS. 10A-10B illustrate perspective views of two examples of a typical recessed lighting fixture, in accordance with at least one embodiment.
Figure 10B:
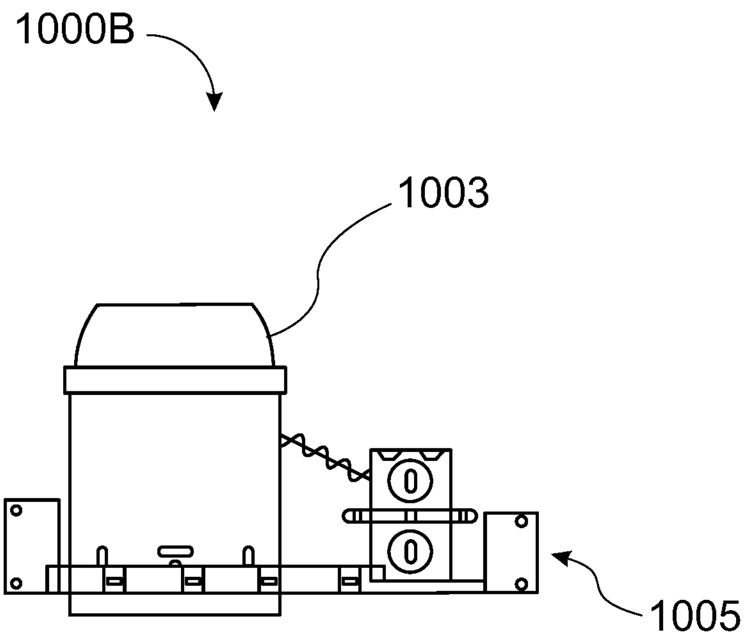

FIGS. 10A-10B illustrate two examples (1000A and 1000B) of a typical recessed lighting fixture (1005) and it's embodied housing (1003), metal trim (1002) and tabs (1004) attached to the inside walls of the recessed lighting housing (1003) that are used to hold torsion springs (103) securely inside the recessed lighting housing (1003).

In real-time use, a user such as a consumer or an electrician must decide whether the installation of the complete fixture (112) is a retrofit, new construction, or electrical outlet box application and then selects the appropriate attachment clips and accessories and chooses the appropriate attachment method. The following FIGS. 11A, 11B, 11C, 13A, 13B, 13C, 15A, 15B, and 15C will show the most common applications of this apparatus into each of the retrofit, new construction, and electrical outlet box installations.

FIGS. 11A-11D illustrate perspective views (1100A-1100D) of examples of a typical retrofit installation of a recessed lighting fixture into an existing recessed lighting fixture (1005). First the user removes the light bulb from the lamp holder (socket) (1001) and trim (1002) from the existing recessed lighting fixture should they exist and exposes the recessed lighting housing (1003). Then user removes the two new construction clips (104) from the complete fixture (112), if attached to the body (108) or connecting posts (106), and attaches friction retrofit clips (102) or torsion spring retrofit clips (103) as dictated by the recessed housing (1003), if not already attached to the body (108) by screwing them with provided screws to the body (108) in the provided screw holes (110), if necessary, or other provided attachment methods. Then user screws the socket adapter (114) into the lamp holder (socket) (1001) in the existing recessed lighting fixture housing (1003). Then user connects the free wires (501) (white and black) of the socket adapter (114) to the white and black wires of the junction box (116) by securing the wires with wire nuts (1407), if included, or other appropriate wire connectors. Then user places the junction box (116) on top of the body (108) (if the junction box (116) is not attached to the body (108)). Then user squeezes the torsion spring clips (103) and inserts the ends of them into the tabs (1004) on the inside wall of the recessed lighting fixture housing (1003). The user then pushes the body (108) flush with the ceiling (1102) and the junction box (116) fully into the recessed lighting fixture housing (1003). In another retrofit application, the recessed lighting fixture housing (1003) may not contain tabs (1004) to accommodate the torsion spring retrofit clips (103) so it will be necessary to attach friction clips (102) to the body (108) or the complete fixture (112) and insert into the recessed lighting fixture housing (1003), whereby the body (108) or the complete fixture (112) is held inside the recessed lighting fixture housing (1003) by the friction of retrofit clips (102) against the inside wall of the recessed lighting fixture housing (1003).

FIGS. 11E-11H illustrate perspective views (1100E-1100H) of another examples of a typical retrofit installation of a flush mount lighting fixture embodying a removeable lens or diffuser (903) into an existing recessed lighting fixture (1005). First the user removes the light bulb from the lamp holder (socket) (1001) and trim (1002) from the existing recessed lighting fixture should they exist and exposes the recessed lighting fixture housing (1003). Then user removes the two new construction clips (104) from the complete fixture (112), if attached to the body (108) or connecting posts (106), and attaches friction retrofit clips (102) or torsion spring retrofit clips (103) as dictated by the recessed lighting fixture housing (1003), if not already attached to the body (108) by screwing them with provided screws to the body (108) in the provided screw holes (110), if necessary. Then user screws the socket adapter (114) into the lamp holder (socket) (1001) in the existing recessed lighting fixture housing (1003). Then user connects the free wires (501) (white and black) of the socket adapter (114) to the white and black wires of the body (108) by securing the wires with wire nuts (1407), if provided, or other appropriate wire connectors. Then user carefully tucks the connected wires inside the recessed lighting fixture housing (1003). Then user squeezes the torsion spring clips (103) and inserts the ends of them into the tabs (1004) on the inside wall of the recessed lighting housing (1003). The user then pushes the body (108) flush with the ceiling (1102). If a junction box (116) is provided and attached to the inside of the body (108) such junction box (116) is fully inserted into the recessed lighting housing (1003). If a junction box (116) is provided and if said junction box (116) is not fixed to the body (108) or complete fixture (112) user places the junction box (116) inside the recessed lighting housing (1003). In another retrofit application, the recessed lighting housing (1003) may not contain tabs (1004) to accommodate the torsion spring retrofit clips (103) so it will be necessary to attach friction clips (102) to the body (108) or the complete fixture (112) and insert into the recessed lighting housing (1003), whereby the body (108) or the complete fixture (112) is held flush to the ceiling by the friction of retrofit clips (102) against the inside wall of the recessed lighting housing (1003). Then user screws the long threaded pipe (1410) into the threaded coupling (1408). Then user secures the lens or diffuser (903) by pushing it up towards the body (108) and allowing the long threaded pipe (1410) to pass through a hole in the bottom of the lens or diffuser (903). Then user screws the lock nut (1406) and decorative finial (904) onto the free end of the long threaded pipe (1410).

Figure 11A:
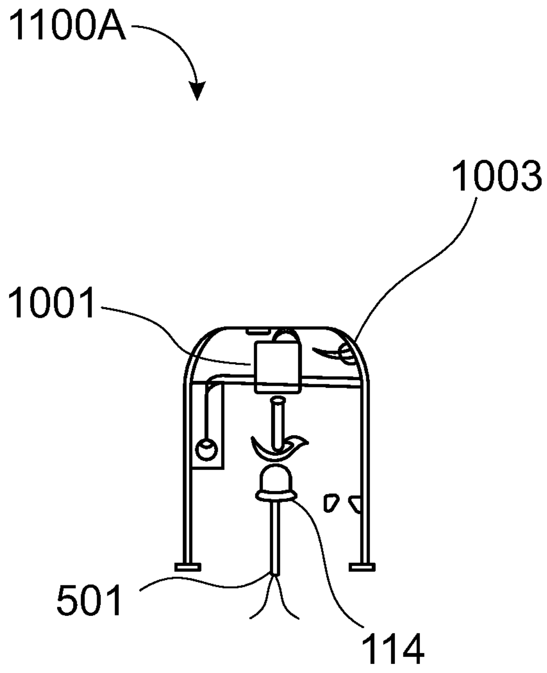
FIGS. 11A-11D illustrate perspective views of examples of a typical retrofit installation of a recessed lighting fixture into in an existing recessed lighting housing, in accordance with at least one embodiment.
Figure 11B:
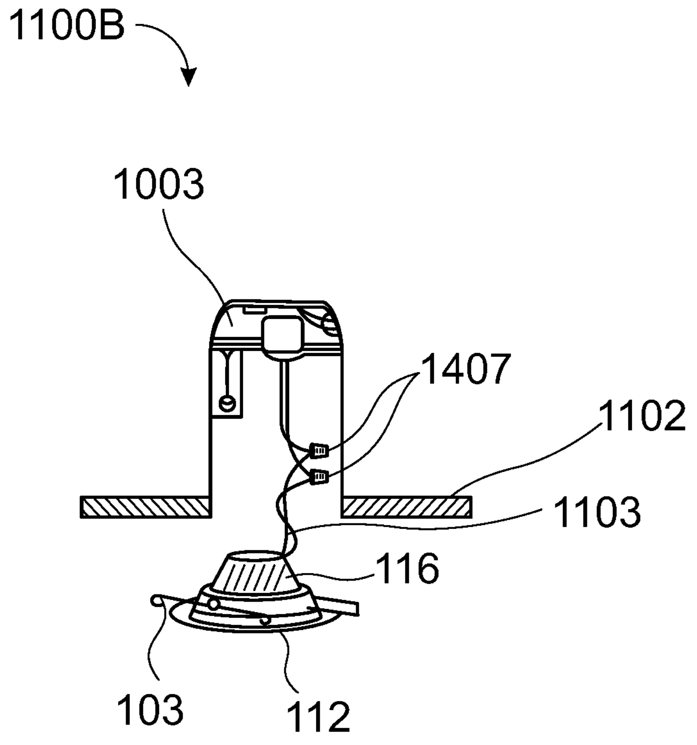
Figure 11C:
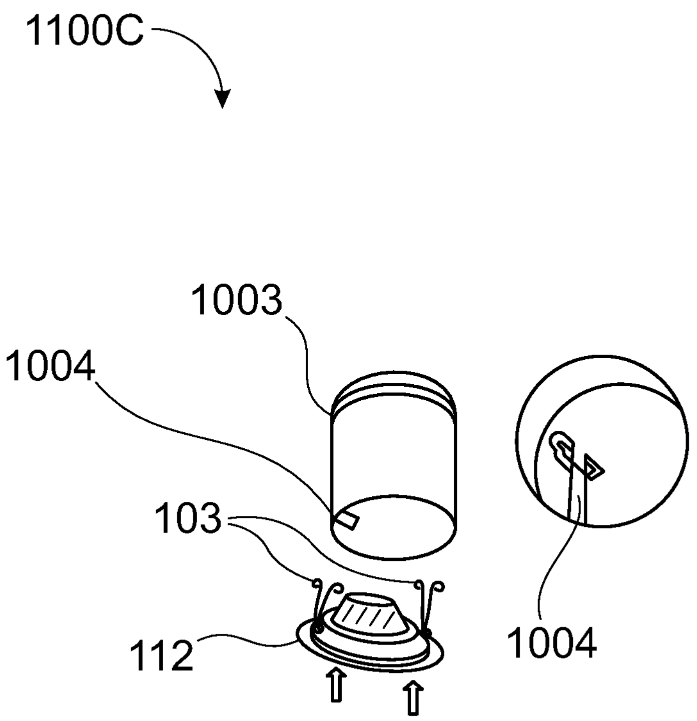
Figure 11D:
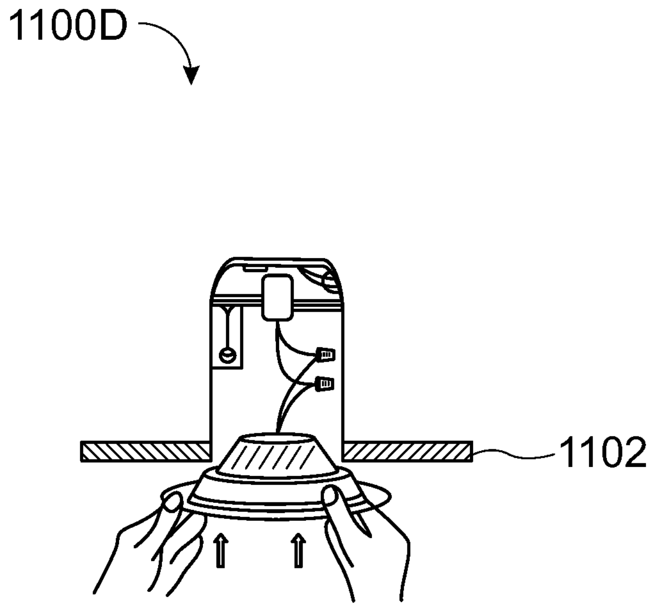
Figure 11E:
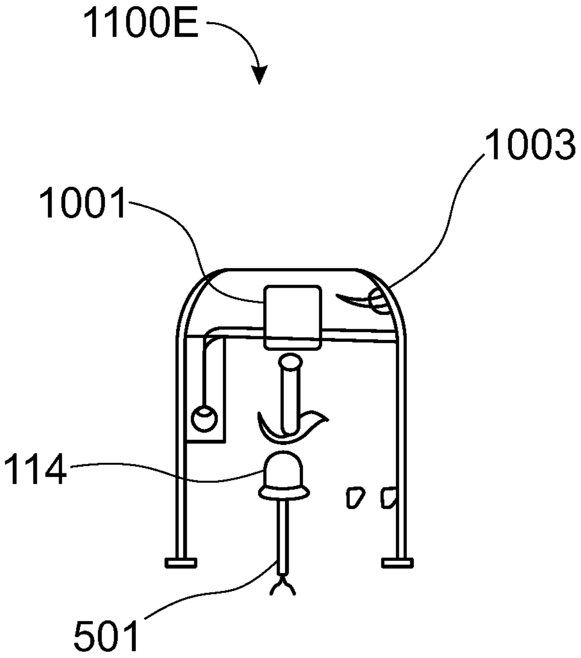
FIGS. 11E-11H illustrate perspective views of another examples of a typical retrofit installation of a flush mount lighting fixture, with a closed bottom removable lens or diffuser, into a recessed lighting housing, in accordance with at least one embodiment.
Figure 11F:
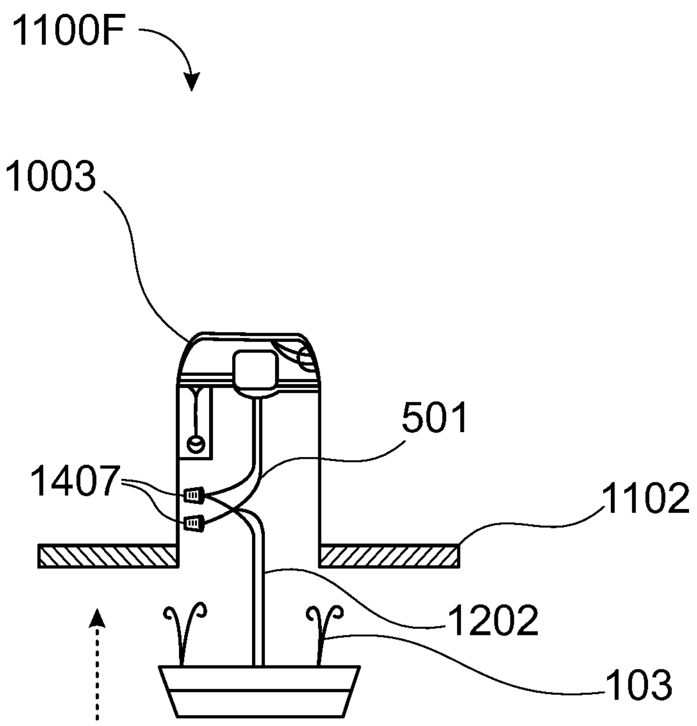
Figure 11G:
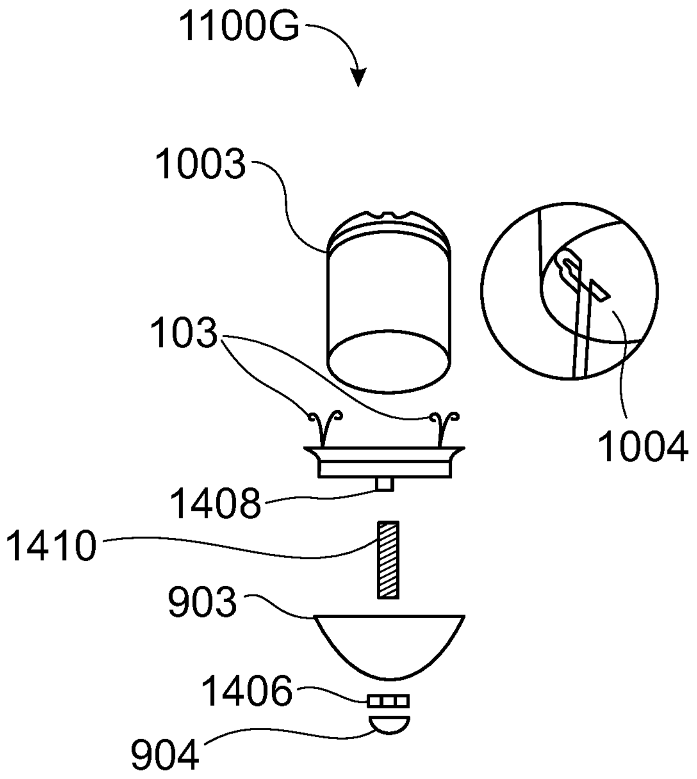
Figure 11H:
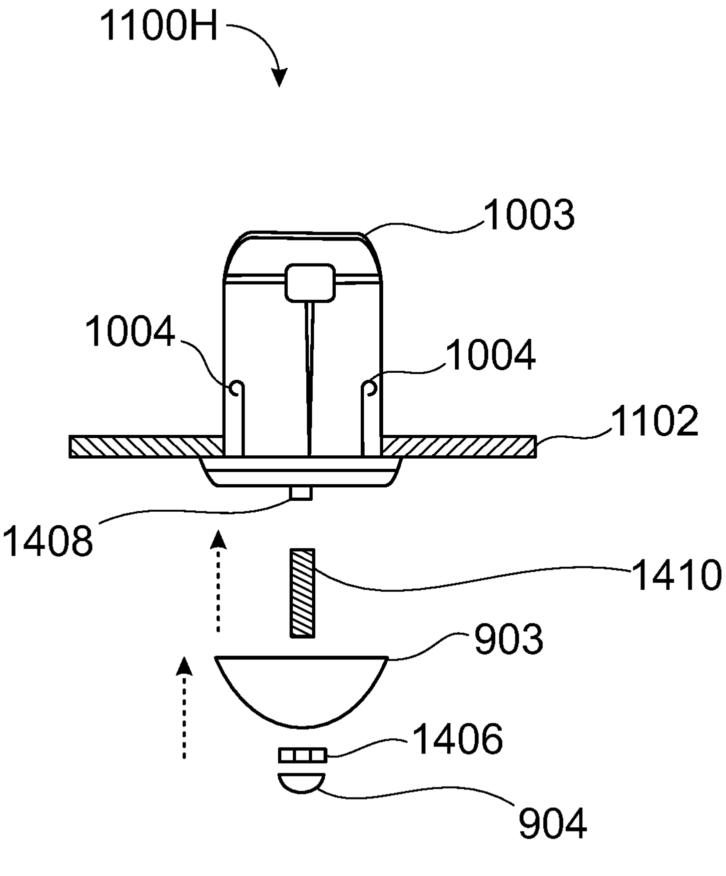
Figure 11I:
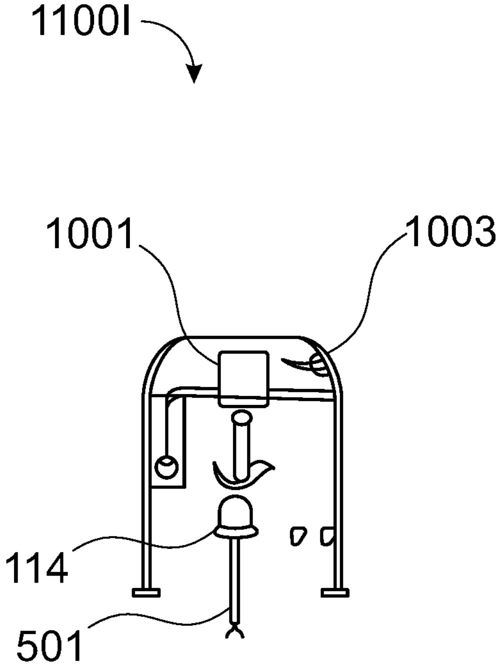
FIGS. 11I-11K illustrates perspective views of another examples of a typical retrofit installation of a flush mount lighting fixture, with an open bottom or no lens or diffuser, into a recessed lighting housing, in accordance with at least one embodiment.
Figure 11J:
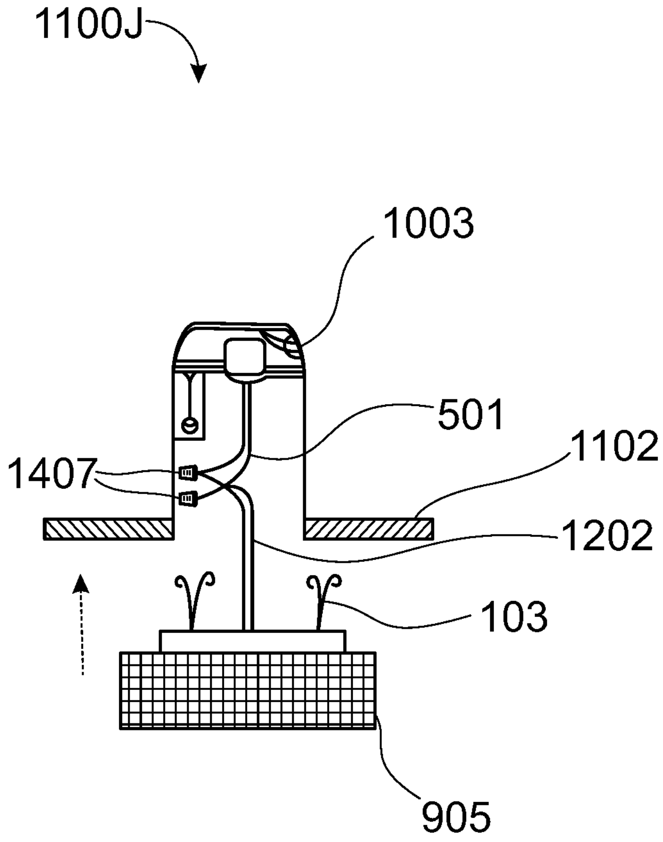
Figure 11K:
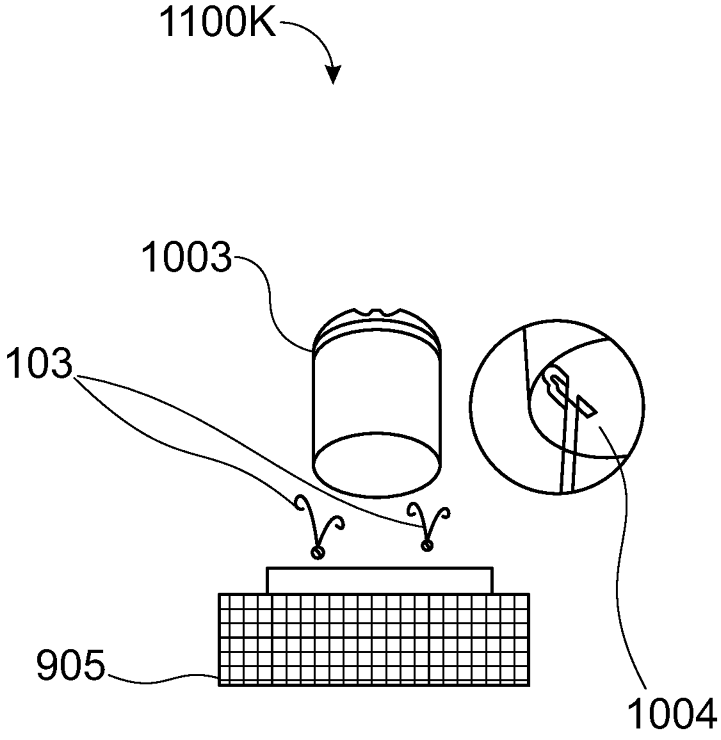

FIGS. 11I-11K illustrate perspective views (1100I-1100K) of another examples of a typical retrofit installation of an open bottom flush mount lighting fixture with or without out a lens or diffuser (903) into an existing recessed lighting fixture (1005). First the user removes the light bulb from the lamp holder (socket) (1001) and trim (1002) from the existing recessed lighting fixture (1005) should they exist and exposes the recessed lighting fixture housing (1003). Then user removes the two new construction clips (104) from the complete fixture (112), if attached to the body (108) or connecting posts (106), and attaches friction retrofit clips (102) or torsion spring retrofit clips (103) as dictated by the recessed housing (1003), if not already attached to the body (108) by screwing them with provided screws to the body (108) in the provided screw holes (110), if necessary.

Then user screws the socket adapter (114) into the lamp holder (socket) (1001) in the existing recessed lighting fixture housing (1003). Then user connects the free wires (501) (white and black) of the socket adapter (114) to the white and black wires of the body (108) by securing the wires with wire nuts (1407), if provided, or other appropriate wire connectors. Then user squeezes the torsion spring clips (103) and inserts the ends of them into the tabs (1004) on the inside wall of the recessed lighting housing (1003). The user then pushes the body (108) flush with the ceiling (1102). If a junction box (116) is provided and attached to the inside of the body (108) such junction box (116) is fully inserted into the recessed lighting housing (1003). If a junction box (116) is provided and if said junction box (116) is not fixed to the body (108) or complete fixture (112) user places the junction box (116) inside the recessed lighting housing (1003). In another retrofit application, the recessed lighting housing (1003) may not contain tabs (1004) to accommodate torsion spring retrofit clips (103) so it will be necessary to attach friction clips (102) to the body (108) or the complete fixture (112) and insert into the recessed lighting housing (1003), whereby the body (108) or the complete fixture (112) is held flush to the ceiling by the friction of retrofit clips (102) against the inside wall of the recessed lighting housing (1003).

Figure 12A:
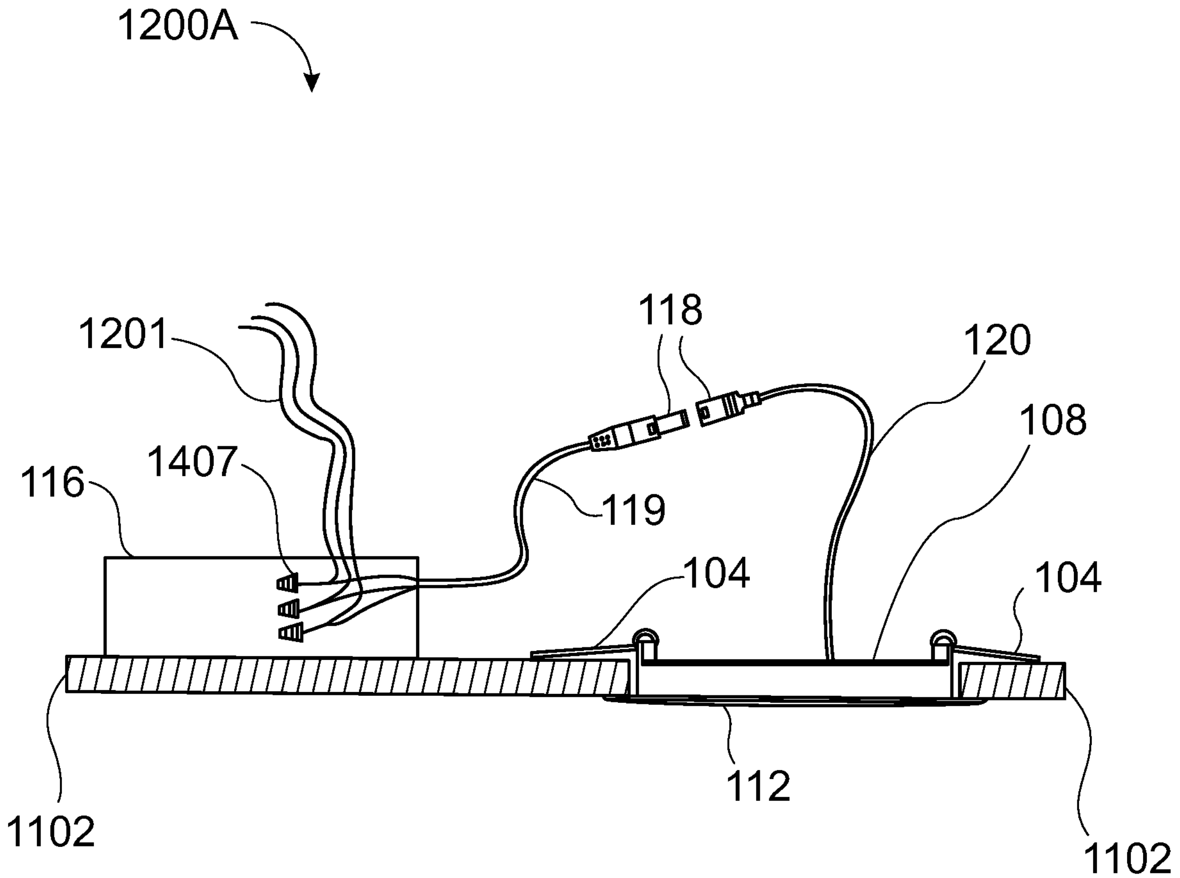
FIG. 12A illustrates a perspective view of an example of a squeezed ceiling by new construction clips, in accordance with at least one embodiment.

FIG. 12A illustrates a perspective view of an example of a recessed lighting fixture installed into a ceiling using the new construction method and new construction clips (104) whereby the body (108) is inserted inside the ceiling (1102) and the junction box (116) is placed on the inside of the ceiling (1102). The body is held in place by the new construction clips (104) squeezing the ceiling material (1102) between them and the extremity (126) of the body. It also illustrates the electrical supply wires (1201) are connected to the output wires (119) of the junction box (116) using provided wire nuts (1407) or other suitable attachment methods. Such connections are made within a designated space inside the junction box (116). The junction box output wires (119), enclosed in a protective sleeve, are connected to the input wires (120), enclosed in a protective sleeve, of the body (108) using twist connectors (118) or by other provided connectors, or other suitable attachment methods.

Figure 12B:
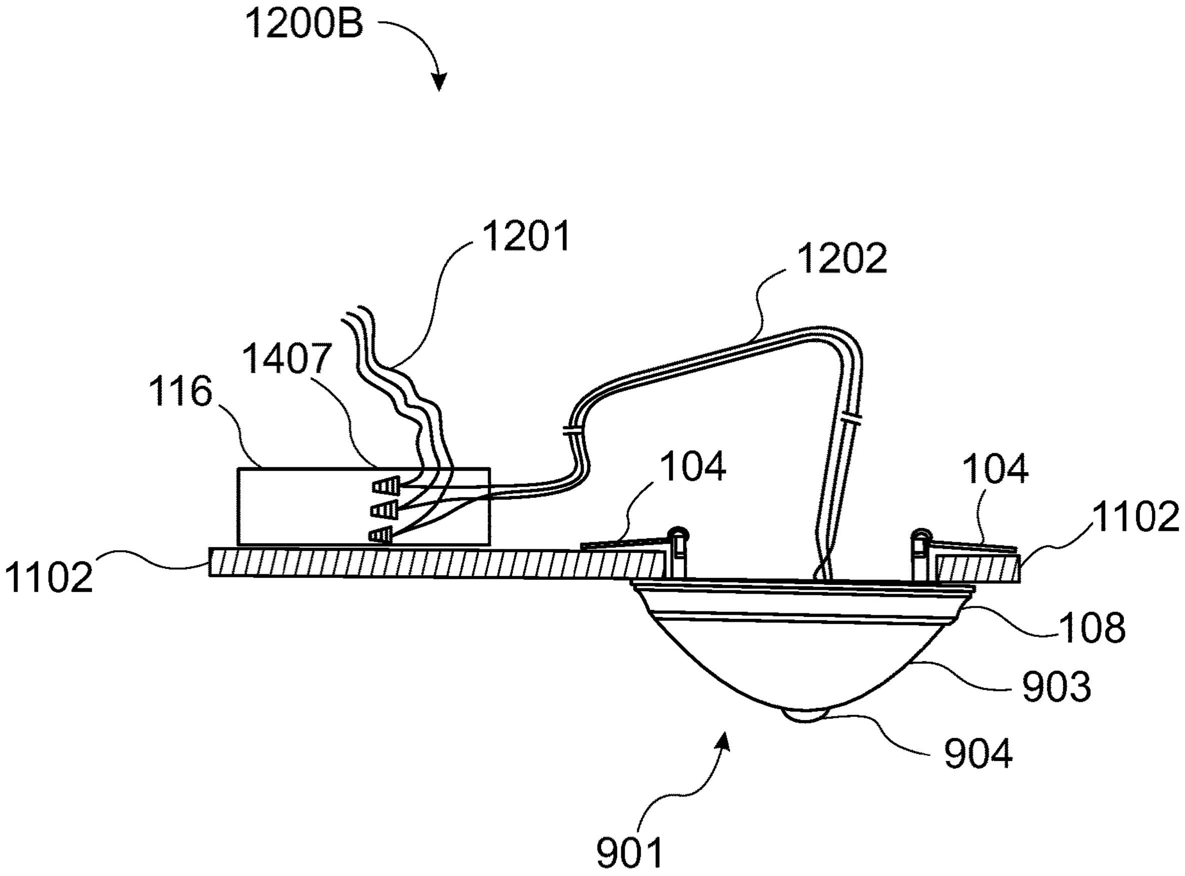
FIG. 12B illustrates a perspective view of another example of a squeezed ceiling by new construction clips, in accordance with at least one embodiment.

FIG. 12B illustrates a perspective view of an example of a flush mount lighting fixture (901) with a removable closed diffuser (903) installed into a ceiling using the new construction method and new construction clips (104) whereby the body (108) sits flush against the ceiling (1102) and the junction box (116) is placed on the inside of the ceiling (1102). The body (108) is held in place by the new construction clips (104) squeezing the ceiling material (1102) between them and the extremity (126) of the body (108). It also illustrates the electrical supply wires (1201) are connected to the input wires (1202) of the body (108) or the complete fixture (112) using provided wire nuts (1407), or by other provided connectors, or other suitable attachment methods. Such connections are made within a designated space inside the junction box (116).

Figure 12C:
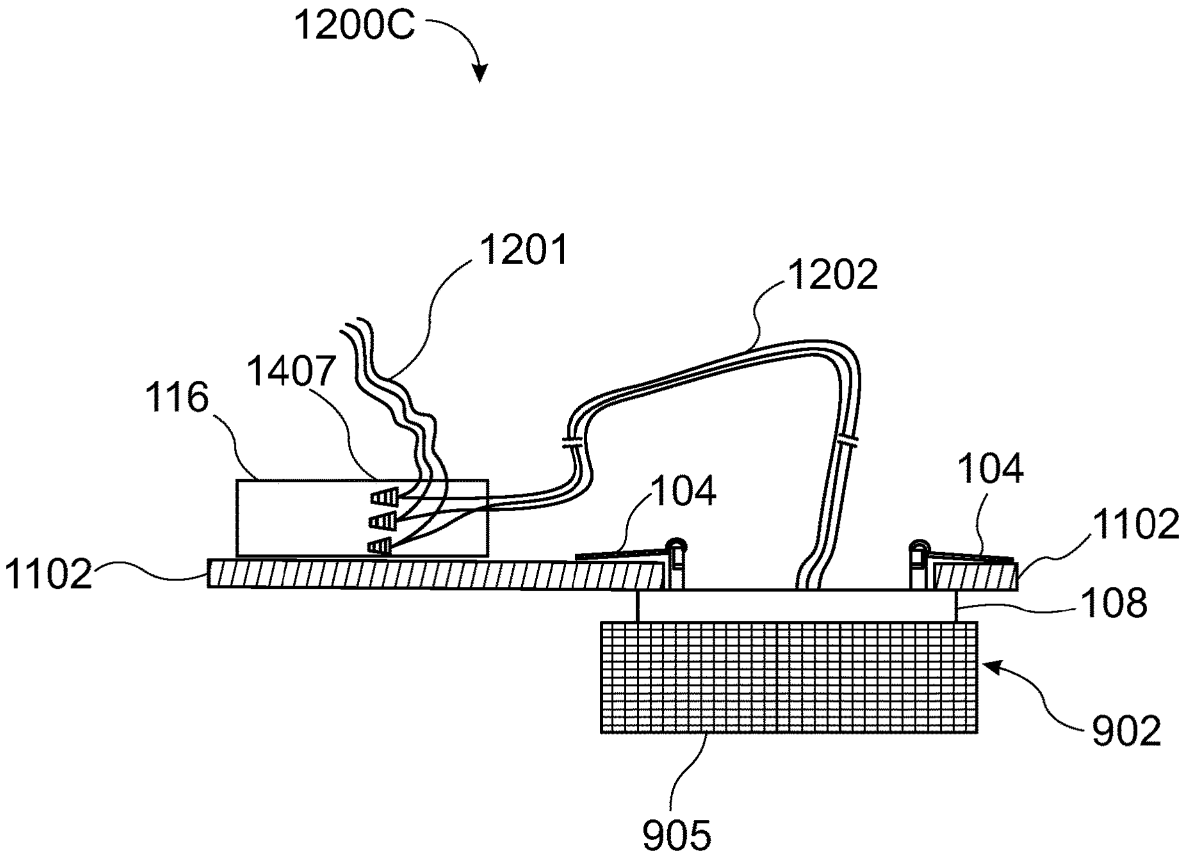

FIG. 12C illustrates a perspective view of an example of an open bottom flush mount lighting fixture (902) with or without an open bottom lens or diffuser (905) installed into a ceiling using the new construction method and new construction clips (104) whereby the body (108) sits flush against the ceiling (1102) and the junction box (116) is placed on the inside of the ceiling (1102). The body (108) is held in place by the new construction clips (104) squeezing the ceiling material (1102) between them and the extremity (126) of the body (108). It also illustrates the electrical supply wires (1201) are connected to the input wires (1202) of the body (108) or the complete fixture (112) using provided wire nuts (1407), or other provided connectors, or other suitable attachment methods. Such connections are made within a designated space inside the junction box (116).

Figure 13A:
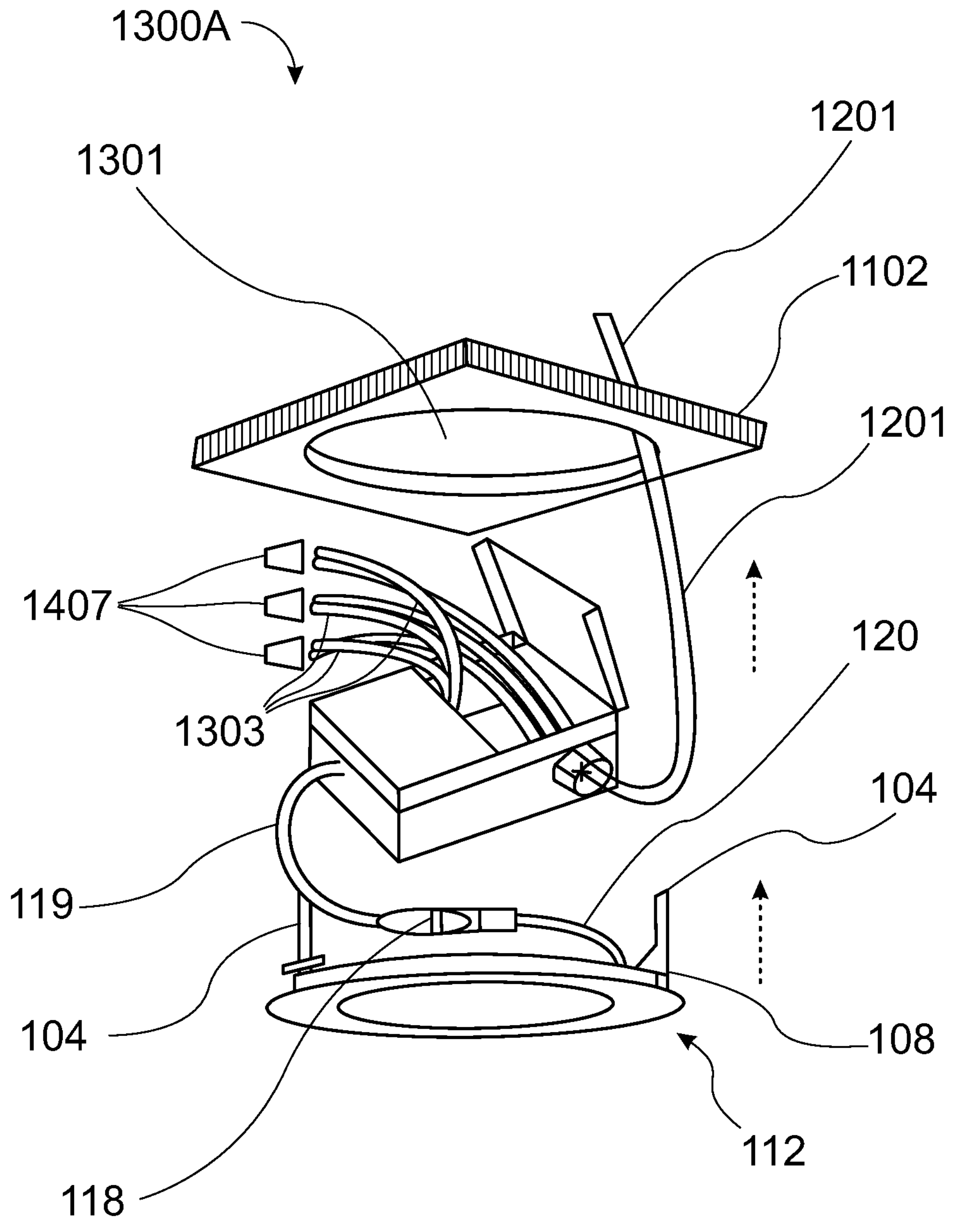
FIG. 13A illustrates a perspective view of an example of a typical new construction installation of a recessed lighting fixture into a typical ceiling, in accordance with at least one embodiment.

FIG. 13A illustrates a perspective view (0300A) of an example of a typical installation of a recessed lighting fixture using the new construction application into a typical ceiling, in accordance with at least one embodiment. For the new construction installation, the user cuts a hole (1301) in the ceiling (1102) of the appropriate size to accommodate the body (108), where the complete fixture (112) is to be located. Then user pulls wires from the building's electrical system (1201) and attaches them to the free wires (1303) in the junction box (116) (ground, white, and black wires) using the provided wire nuts (1407) or other wire connectors, or other suitable attachment methods, in the space provided for wire connections within the junction box (116). Then user attaches the junction box (116) output wires (119), enclosed in a protective sleeve, to the body input wires (120), enclosed in a protective sleeve, using the twist connector (118), if provided, or other wire connectors or other suitable connection methods. Then user pushes the junction box (116) through a hole in the ceiling and allows it to rest on inside of the ceiling, as referenced in FIG. 12A. Then user pushes new construction clips (104) perpendicular to the ceiling and pushes them through the ceiling hole. Then user releases new construction clips (104) and allows them to squeeze the ceiling (1102) between the new construction clips (104) and the extremity (126) of the body (108). FIG. 12A illustrates a perspective view (1200A) of an example of a squeezed ceiling by new construction clips, in accordance with at least one embodiment.

Figure 13B:
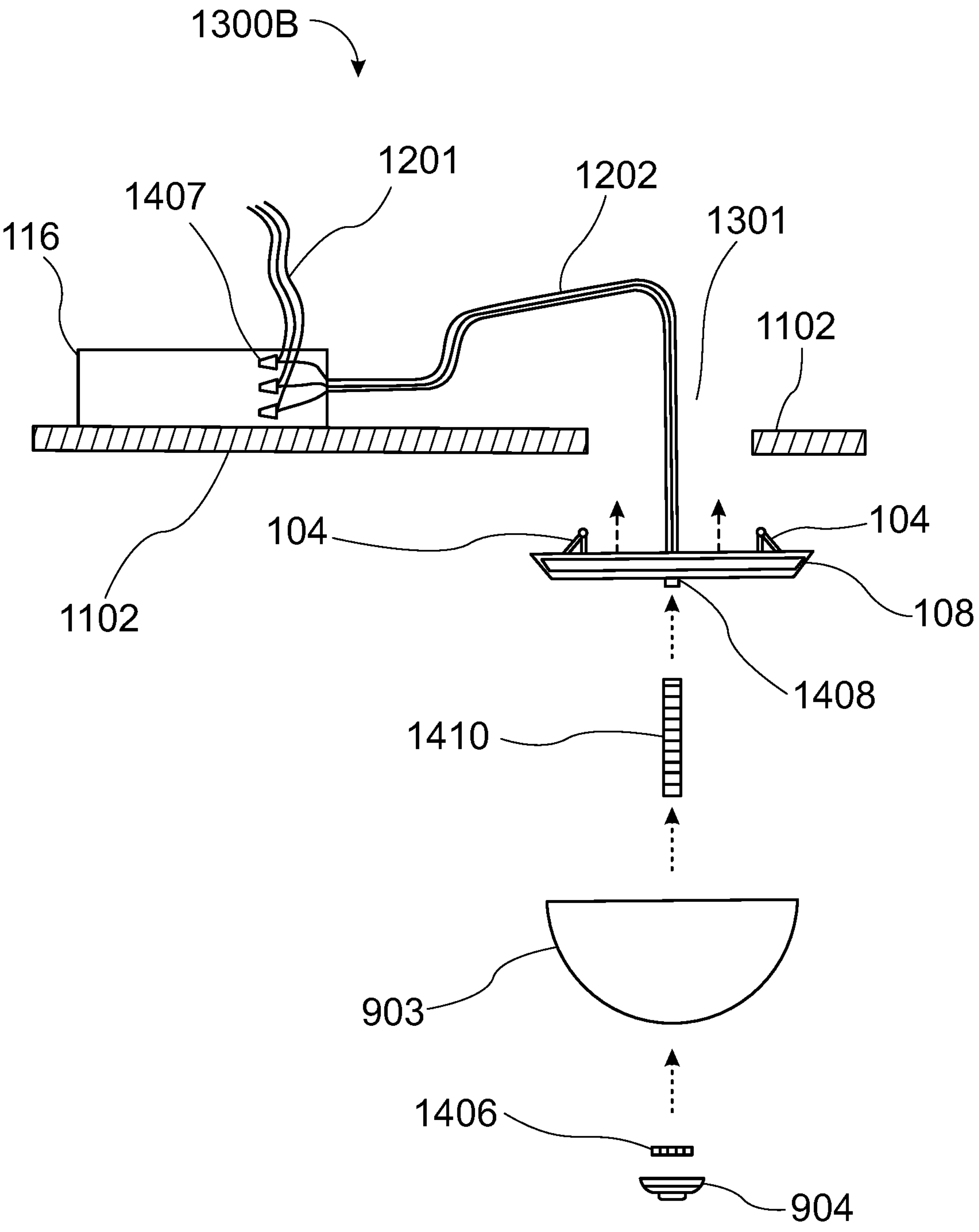
FIG. 13B illustrates a perspective view of an example of a typical new construction installation of a flush mount lighting fixture, with a closed bottom removable lens or diffuser, into a typical ceiling, in accordance with at least one embodiment.

FIG. 13B illustrates a perspective view (1300B) of an example of a typical installation of a flush mount lighting fixture with a removable closed bottom lens or diffuser (903) using the new construction application into a typical ceiling, in accordance with at least one embodiment. For the new construction installation, the user cuts a hole (1301) in the ceiling (1102) of the appropriate size to accommodate the new construction clips (104) attached to the body (108), where the complete fixture (112) is to be located. Then user pulls wires from the building's electrical system (1201) and attaches them to the free wires (1202) of the body (108) or complete fixture (112) (ground, white, and black wires) using the provided wire nuts (1407) or other wire connectors, or other suitable attachment methods, in the space provided for wire connections within the junction box (116), as referenced in FIG. 12B. Then user pushes new construction clips (104) perpendicular to the ceiling and pushes them through the ceiling hole. Then user releases new construction clips (104) and allows them to squeeze the ceiling (1102) between the new construction clips (104) and the extremity (126) of the body (108). FIG. 12B illustrates a perspective view (1200B) an example of a squeezed ceiling by new construction clips, in accordance with at least one embodiment. Then user screws the long threaded pipe (1410) into the threaded coupling (1408). Then user secures the lens or diffuser (903) by pushing it up towards the body (108) and allowing the long threaded pipe (1410) to pass through a hole in the bottom of the lens or diffuser (903). Then user screws the lock nut (1406) and decorative finial (904) onto the free end of the long threaded pipe (1410).

Figure 13C:
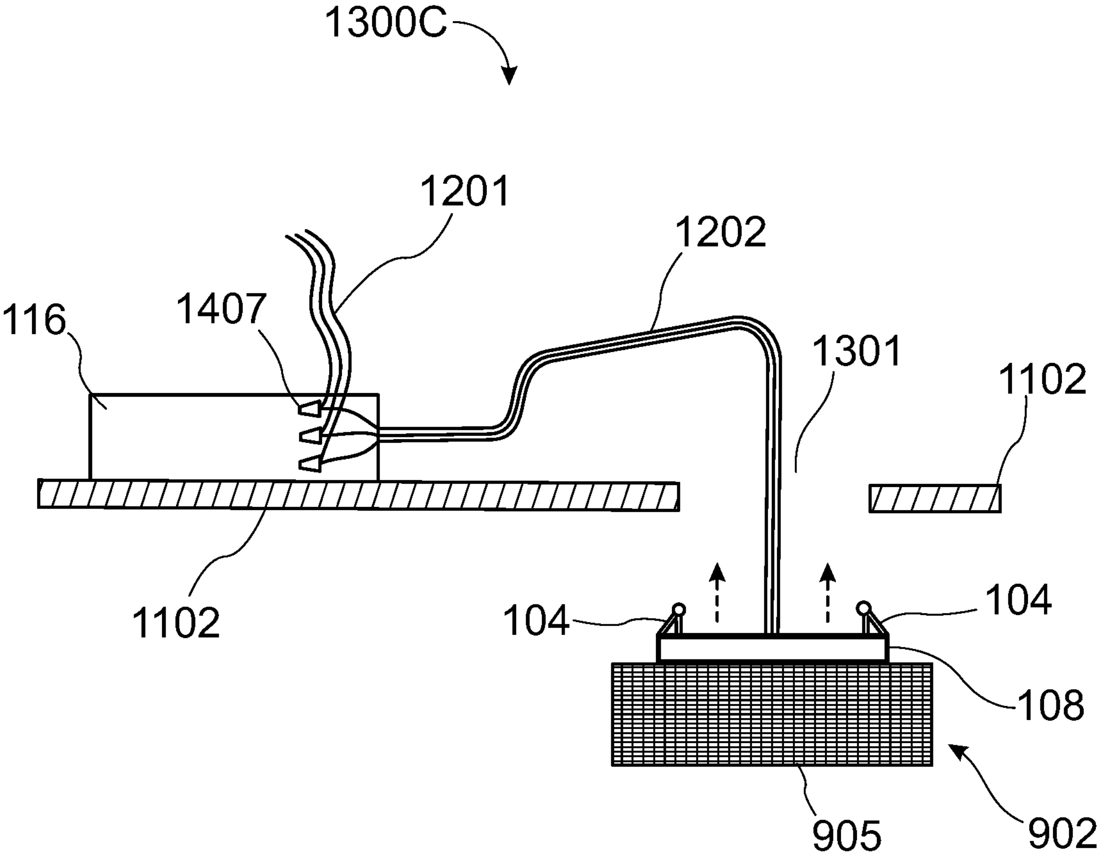
FIG. 13C illustrates a perspective view of an example of a typical new construction installation of a flush mount lighting fixture, with an open bottom or no lens or diffuser, into a typical ceiling, in accordance with at least one embodiment.

FIG. 13C illustrates a perspective view (1300C) of an example of a typical installation of a flush mount lighting fixture (902) with an open bottom (905) using the new construction application into a typical ceiling, in accordance with at least one embodiment. For the new construction installation, the user cuts a hole (1301) the ceiling (1102) of the appropriate size to accommodate the new construction clips (104) attached to the body (108), where the complete fixture (112) is to be located. Then user pulls wires from the building's electrical system (1201) and attaches them to the free wires (1202) of the body (108) or complete fixture (112) (ground, white, and black wires) using the provided wire nuts (1407) or other wire connectors, or other suitable attachment methods, in the space provided for wire connections within the junction box (116), as referenced in FIG. 12C. Then user pushes new construction clips (104) perpendicular to the ceiling and pushes them through the ceiling hole. Then user releases new construction clips (104) and allows them to squeeze the ceiling (1102) between the new construction clips (104) and the extremity (126) of the body (108). FIG. 12C illustrates a perspective view (1200C) of an example of a squeezed ceiling by new construction clips, in accordance with at least one embodiment.

Figure 14:
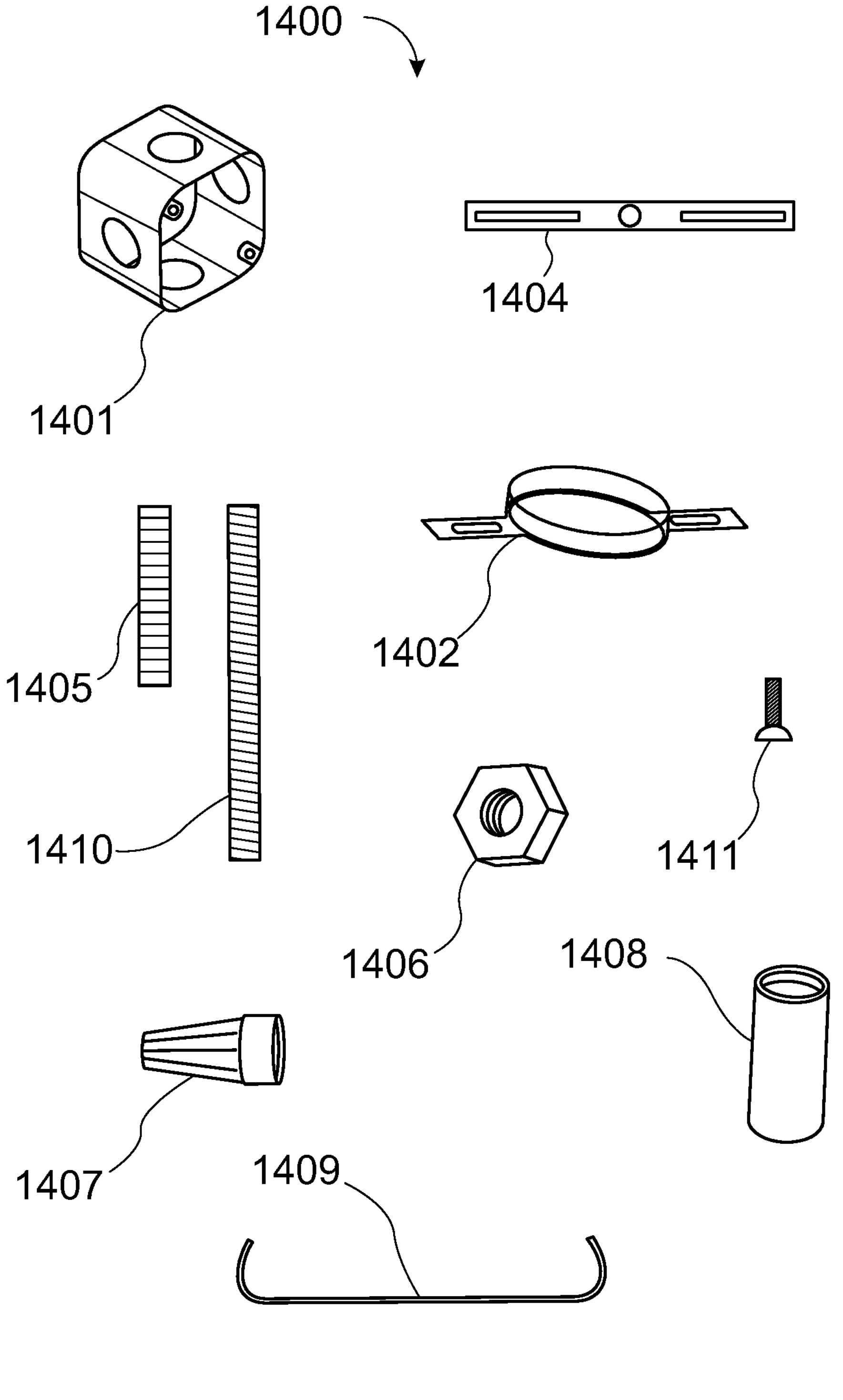
FIG. 14 illustrates a perspective view of some, but not all, of the accessories or additional components that may or may not be required for the various installation methods.

FIG. 14 illustrates a exemplary view (1400) of some, but not all accessories that are embodied in a body (108) or a complete fixture (112).

Figure 15A:
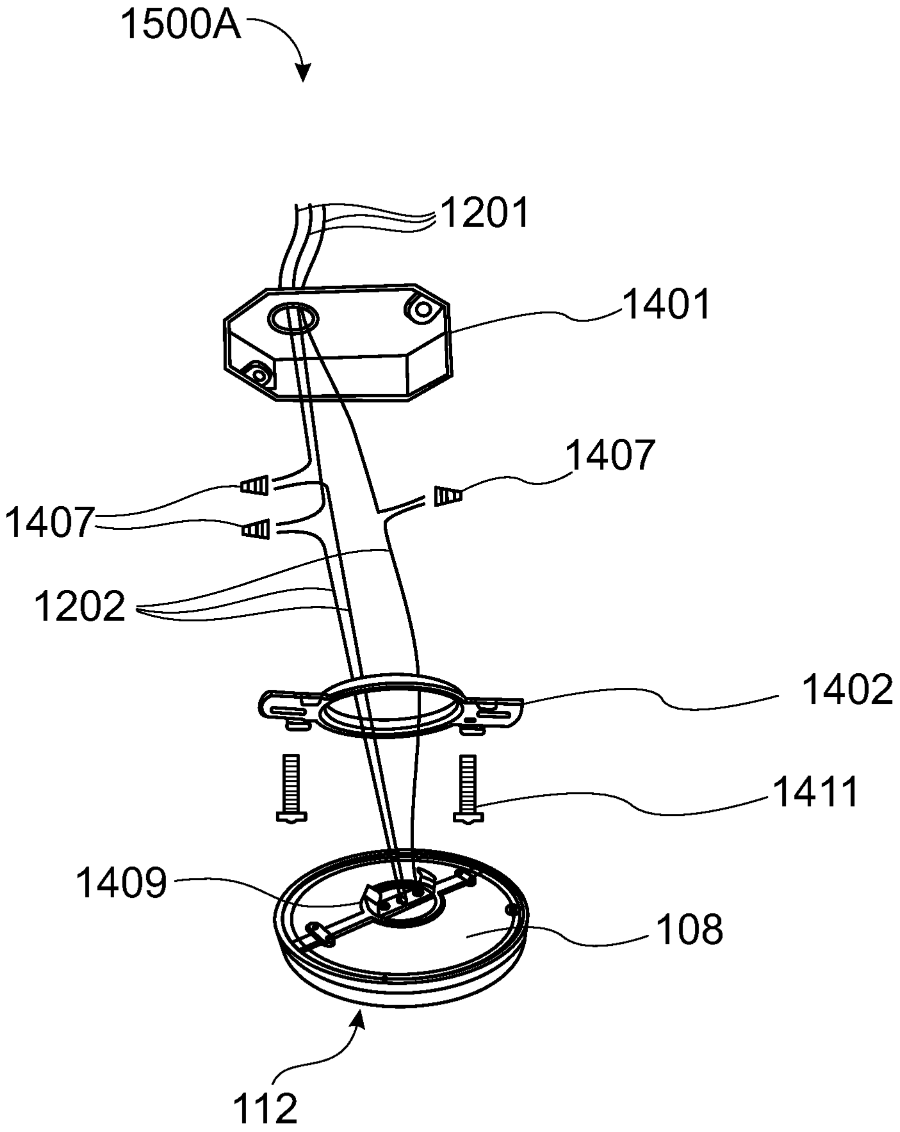
FIG. 15A illustrates a perspective view of an example of a typical installation of a recessed lighting fixture into an electrical outlet box using the installation plate method, in accordance with at least one embodiment.

FIG. 15A illustrates a exemplary view (1500A) of an example of a typical electrical outlet box (1401) installation of a recessed lighting fixture using the installation plate (1402) application, in accordance with at least one embodiment. For this electrical outlet box installation (1401) user attaches the installation plate (1402) to the electrical outlet box (1401) using the provided mounting screws (1411). Then user attaches the building's electrical supply wires (1201) to the fixture input wires (1202) (white, black, and ground) using the provided wire nuts (1407) or other provided wire connectors, or other suitable attachment methods. Then user carefully tucks all wiring into the electrical outlet box (1401). Then user aligns the installation clamp (1409) with the installation plate (1402). Once aligned user pushes the complete fixture (112) firmly into the electrical outlet box (1401) so the installation clamp (1409) sits securely into the installation plate (1402) and allows the complete fixture (112) or body (108) to rest securely against the ceiling, wall, or floor.

Figure 15B:
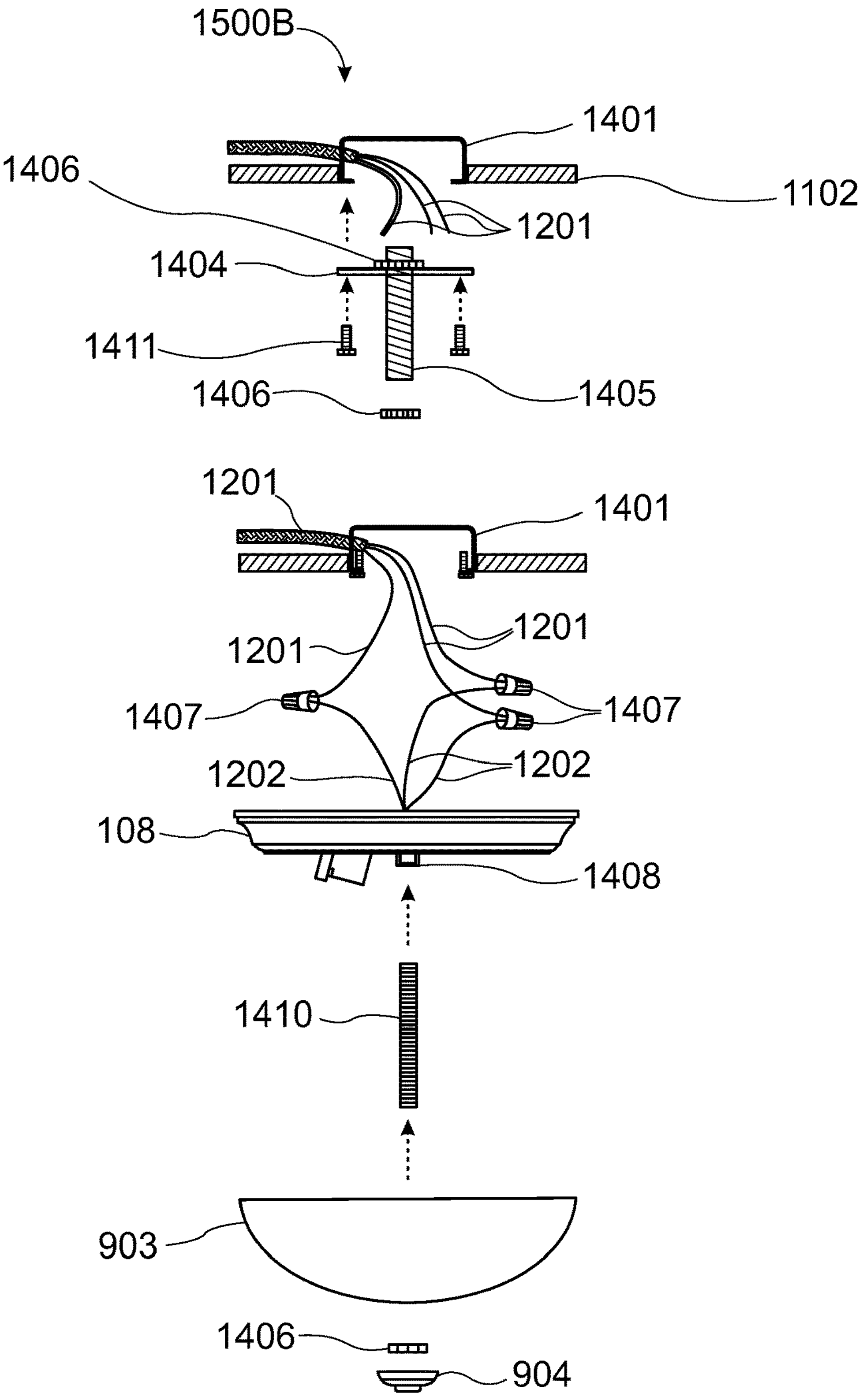
FIG. 15B illustrates a perspective view of an example of a typical installation of a flush mount lighting fixture, with a detachable lens or diffuser, into an electrical outlet box using the mounting plate method, in accordance with at least one embodiment.

FIG. 15B illustrates a exemplary view (1500B) of an example of a typical electrical outlet box (1401) installation of a closed bottom flush mount lighting fixture (901) with detachable lens or diffuser (903), in accordance with at least one embodiment. For this electrical outlet box installation user attaches the short-threaded pipe (1405) into the mounting bracket (1404) and secures it with provided hex nuts (1406). Then user attaches the mounting bracket (1404) to the electrical outlet box (1401) using the provided mounting screws (1411). Then user attaches the supply wires (1201), (black, white, and ground) to the fixture input wires (1202) (black, white, and ground) using the provided wire nuts (1407) or other provided wire connectors, or other suitable attachment methods. Then user carefully tucks all wiring into the electrical outlet box (1401). Then user attaches the body (108) or complete fixture (112) to the free end of the short threaded pipe (1405) using provided threaded coupling (1408). Then user attaches a long threaded pipe (1410), to the free end of threaded coupling (1408). Then user secures the lens or diffuser (903) by pushing it up towards the body (108) and allowing the long threaded pipe (1410) to pass through a hole in the bottom of the lens or diffuser (903). Then user screws the lock nut (1406) and decorative finial (904) onto the free end of the long threaded pipe (1410).

Figure 15C:
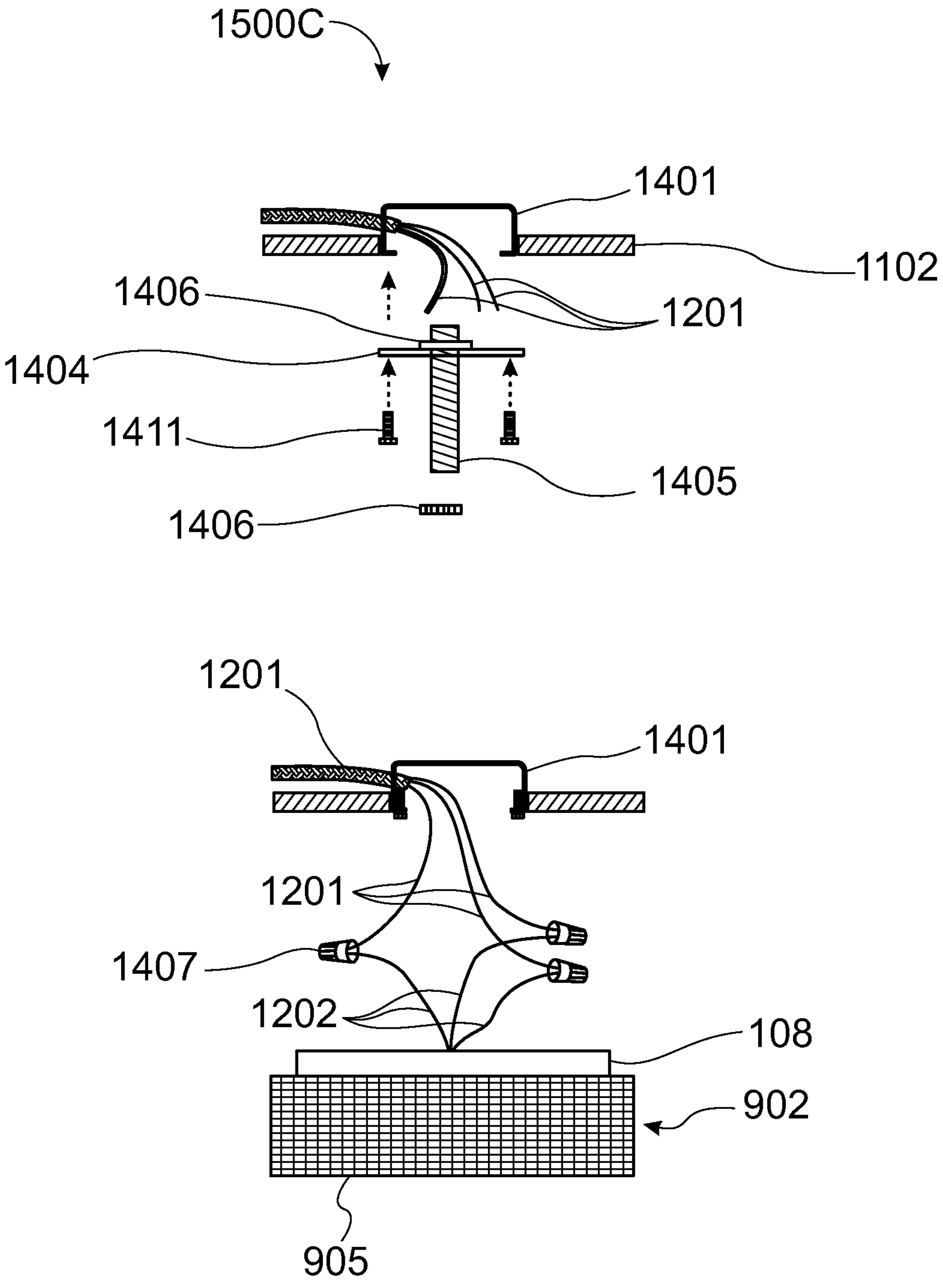
FIG. 15C illustrates a perspective view of an example of a typical installation of a flush mount lighting fixture, with an open bottom or no lens or diffuser, into an electrical outlet box using the mounting plate method, in accordance with at least one embodiment.

FIG. 15C illustrates a exemplary view (1500*c*) of an example of a typical electrical outlet box (1401) installation of an open bottom flush mount lighting fixture (902) with or without a lens or diffuser (905), using the direct screw application, in accordance with at least one embodiment. For this electrical outlet box installation user attaches the short-threaded pipe (1405) into the mounting bracket (1404) and secures it with provided hex nuts (1406). Then user attaches the mounting bracket (1404) to the electrical outlet box (1401) using the provided mounting screws (1411). Then user attaches the supply wires (1201), (black, white, and ground) to the fixture input wires (1202) (black, white, and ground) using the provided wire nuts (1407) or other provided wire connectors, or other suitable attachment methods. Then user carefully tucks all wiring into the electrical outlet box (1401). Then user secures the body (108) or complete fixture (112) by pushing it up towards the electrical outlet box (1401) allowing the short threaded pipe's (1405) free end to pass through a hole in the body (108) or complete fixture (902). Then user secures the complete fixture (902) using provided threaded coupling (1408) or hex nut (1406), whichever is provided.

In an embodiment, the present apparatus may be of varying designs, shapes, sizes and materials. In some cases, the body (108) is a base of the complete fixture (112) which may contain a plurality of connecting posts (106), to attach new construction clips (104) and may contain a plurality of screw holes (110) a plurality of retrofit clips (102) & (103) that may be attached to the base (108) by way of screwing, riveting, gluing, welding or other suitable attachment methods. In an embodiment, the removable or fixed junction box (116) is made from varying designs, sizes, shapes, thicknesses and materials and may include any number of knock out holes to be used for wiring. Further, an LED driver, a transformer, a WIF module, a ballast, or other electrical components may be installed inside the junction box (116) and it may also contain a predetermined area for wiring. In an exemplary embodiment, the present apparatus may be manufactured in varying designs, shapes, sizes, thicknesses, and materials suitable for its purpose.

In an embodiment, the components of the present apparatus if provided, such as the plurality of retrofit clips (102) and (103), the plurality of new construction clips (104), the body (108), the plurality of screw holes (110), the complete fixture (112), the socket adapter (114), the junction box (116), the twist connector (118), the wire nuts (1407) the decorative finial (904), the mounting plate (1404), the installation clamp (1409), the mounting bracket (1402), the lock nuts (1406), the threaded pipes (1405) and (1410), the threaded coupling (1408), and other common accessories such as screws, wires, etc. are reconfigurable to varying designs, shapes, sizes, thicknesses, and materials, suitable for its purpose.

Thus, the present apparatus provides a means to attach a light fixture to the ceiling directly, or into a recessed lighting fixture housing, or attach to a ceiling, wall, or floor outlet box. By providing retrofit, new construction, and electrical outlet box applications, the present apparatus reduces the amount of inventory carried. In addition, the present apparatus does not require the purchase and installation of additional electrical accessories, or recessed lighting housings, or other components, thus saving the user and/or electrician money and time during the installation of lighting fixtures.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

It should be well noted that the light fixture as proposed in this application may be of different designs, shapes, sizes, and made from any material suitable for its intended use. The light fixture may contain varying amounts of installation clips of varying designs, shapes, sizes, materials, and attachment methods to the body or other parts of the lighting fixture. The junction box may be any design, size, shape, thickness, permanently attached or removable, and made from any suitable material for its intended use. Wire connectors of varying shapes, sizes, and types and may or may not be included with the apparatus herein claimed. Accessories such as screws, bolts, washers, nuts, finials, wire connectors, etc., may or may not be included with the apparatus herein claimed.

The invention claimed is:

1. An apparatus, comprising:

a light source attachable to, and detachable from, a mounting surface in at least three different scenarios;

a body to which the light source is attached, wherein a wire extends into or out of the body for connecting, directly or indirectly, to a supply wire for supplying electricity for the light source that is attached to the body;

a plurality of first clips connectable to the body for attaching the light source to the mounting surface when, in a first scenario of the at least three different scenarios, an existing recessed lighting fixture housing is available at the mounting surface;

a plurality of second clips, that is different than the plurality of first clips, connectable to the body for attaching the light fixture to the mounting surface when, in a second scenario of the at least three different scenarios, a recessed lighting fixture housing is not present at the mounting surface, wherein a portion of the mounting surface is arranged between the plurality of second clips and an extremity of the body when securing the light fixture to the mounting surface and the recessed lighting fixture housing is not present at the mounting surface;

one or more mounting attachments connectable to the body for attaching the light fixture to the mounting surface when, in a third scenario of the at least three different scenarios, an existing outlet box or existing junction box is present at the mounting surface;

wherein the one or more mounting attachments connect to the existing outlet box or the existing junction box when securing the body to the mounting surface and the existing outlet box or the existing junction box is present at the mounting surface; and a junction box that is connectable to the body for containing an electrical component and wire connection within the junction box when the junction box is attached to the body, wherein the wire connection includes a connection of the wire that extends into or out of the body, and wherein the junction box is attached to the body and extends through the mounting surface with the plurality of first clips, or with the plurality of second clips, when the junction box is utilized in one or more scenarios of the at least three different scenarios.

2. The apparatus of claim 1, further comprising:

one or more wire connectors, wherein at least one wire connector of the one or more wire connectors directly or indirectly connects the wire to the supply wire in any of the three different scenarios.

3. The apparatus of claim 2, further comprising:

a socket adapter that can be screwed into the existing recessed lighting fixture housing when the existing recessed lighting fixture housing is available at the mounting surface, wherein a wire connector of the one or more wire connectors connects a socket adapter wire to the wire extending into or out of the body.

4. The apparatus of claim 3, wherein the one or more mounting attachments include one or more screws, clamps, nuts, bolts, screws, plates, and/or additional housing.

5. The apparatus of claim 1, further comprising:

a removable lens or removable diffuser that is attachable to the body when the body is secured to the mounting surface in each scenario of the three different scenarios.

6. The apparatus of claim 1, further comprising:

a removable diffuser lens that is attachable to, and detachable from, the body in each scenario of the three different scenarios, wherein a portion of the body is located between the mounting surface and the diffuser lens when the diffuser lens is attached to the body in each scenario of the three different scenarios.

7. The system of claim 6, further comprising:

one or more connecting posts that are connected to the body and/or the junction box, wherein the plurality of second clips are connectable to the body via the one or more connecting posts.

8. The apparatus of claim 7, further comprising:

an LED driver that is connected to the light source; and wherein the LED driver is at least partially enclosed by the junction box or the body in each scenario of the three scenarios.

9. An system, comprising:

a light source attachable to, and detachable from, a mounting surface in at least three different scenarios;

a body to which the light source is attached, wherein a wire extends into or out of the body for connecting, directly or indirectly, to a supply wire for supplying electricity for the light source that is attached to the body;

a plurality of first clips connectable to the body for attaching the light source to the mounting surface when, in a first scenario of the at least three different scenarios, an existing recessed lighting fixture housing is available at the mounting surface;

a plurality of second clips connectable to the body for attaching the light fixture to the mounting surface when, in a second scenario of the at least three different scenarios, a recessed lighting fixture housing is not present at the mounting surface, wherein a portion of the mounting surface is arranged between the plurality of second clips and an extremity of the body when securing the light fixture to the mounting surface and the recessed lighting fixture housing is not present at the mounting surface;

one or more mounting attachments connectable to the body for attaching the light fixture to the mounting surface when, in a third scenario of the at least three different scenarios, an existing outlet box or existing junction box is present at the mounting surface;

wherein the one or more mounting attachments connect to the existing outlet box or the existing junction box when securing the body to the mounting surface and the existing outlet box or the existing junction box is present at the mounting surface; and a junction box that is connectable to the body for containing an electrical component and wire connection within the junction box when the junction box is attached to the body, wherein the wire connection includes a connection of the wire that extends into or out of the body, and wherein the junction box is attached to the body and extends through the mounting surface with the plurality of first clips, or with the plurality of second clips, when the junction box is utilized in one or more scenarios of the at least three different scenarios.

10. The system of claim 9, further comprising:

one or more wire connectors, wherein at least one wire connector of the one or more wire connectors directly or indirectly connects the wire to the supply wire in any of the three different scenarios.

11. The system of claim 10, further comprising:

a socket adapter that can be screwed into the existing recessed lighting fixture housing when the existing recessed lighting fixture housing is available at the mounting surface, wherein a wire connector of the one or more wire connectors connects a socket adapter wire to the wire extending into or out of the body.

12. The system of claim 11, wherein the one or more mounting attachments include one or more screws, clamps, nuts, bolts, screws, plates, and/or additional housing.

13. The system of claim 9, further comprising:

a removable lens or removable diffuser that is attachable to the body when the body is secured to the mounting surface in each scenario of the three different scenarios.

14. The system of claim 9, further comprising:

a removable diffuser lens that is attachable to, and detachable from, the body in each scenario of the three different scenarios, wherein the body is located between the mounting surface and the diffuser lens when the diffuser lens is attached to the body in each scenario of the three different scenarios.

15. The system of claim 9, further comprising:

an LED driver that is connected to the light source, wherein the LED driver is at least partially enclosed by the junction box or the body in each scenario of the three scenarios.

16. The system of claim 9, further comprising:

one or more connecting posts that are connected to the body and/or the junction box, wherein the plurality of second clips are connectable to the body via the one or more connecting posts.

* * * * *